(12) United States Patent
Jahns et al.

(10) Patent No.: US 11,623,519 B2
(45) Date of Patent: Apr. 11, 2023

(54) DYNAMIC CHASSIS AND TIRE STATUS INDICATIONS

(71) Applicant: PACCAR Inc, Bellevue, WA (US)

(72) Inventors: Steven Karl Jahns, Bellingham, WA (US); Jonathan Scott Duncan, Seattle, WA (US); Ryan Anthony Reed, Kenmore, WA (US); Jon Forrest Acton, Ft. Worth, TX (US); Jacob Michael White, Flower Mound, TX (US); David Leetz, Denton, TX (US); Mark Andrew Wagner, Bellevue, WA (US); Hervé Jen Raymond Cecchi, Santa Clara, CA (US); Anna-Magdalena Schatz, Bensheim (DE); Christina Nenke, Muehlheim (DE); Marc George Wilczak, Lake Balboa, CA (US); Nicole Johnson, West Los Angeles, CA (US)

(73) Assignee: PACCAR Inc., Bellevue, WA (US)

( * ) Notice: Subject to any disclaimer, the term of this patent is extended or adjusted under 35 U.S.C. 154(b) by 217 days.

(21) Appl. No.: 17/067,433

(22) Filed: Oct. 9, 2020

(65) Prior Publication Data
US 2021/0237574 A1 Aug. 5, 2021

Related U.S. Application Data

(60) Provisional application No. 62/978,698, filed on Feb. 19, 2020, provisional application No. 62/978,691, (Continued)

(51) Int. Cl.
*B60K 35/00* (2006.01)
*B60G 17/0195* (2006.01)
(Continued)

(52) U.S. Cl.
CPC ............ *B60K 35/00* (2013.01); *B60C 23/009* (2013.01); *B60G 17/0195* (2013.01);
(Continued)

(58) Field of Classification Search
None
See application file for complete search history.

(56) References Cited

U.S. PATENT DOCUMENTS 5,172,561 A * 12/1992 Hanson ................ B60H 1/3225
62/130
6,067,805 A * 5/2000 Porter .................. F25B 49/005
62/127
(Continued)

FOREIGN PATENT DOCUMENTS

CN 101311009 A * 11/2008 ............. B60C 23/06
CN 210198844 U * 3/2020
(Continued)

*Primary Examiner* — Chico A Foxx
(74) *Attorney, Agent, or Firm* — Merchant & Gould P.C.

(57) ABSTRACT

Systems, methods, and computer readable storage media provide dynamic chassis and tire status indications associated with a vehicle. Lift axle status data may be graphically represented by a lift axle indicator dynamically provided in a shared notification/messaging space positioned within the driver's line of sight during a lift axle transition. The lift axle indicator may include a side-view representation of the vehicle including a plurality of axle sections indicating the status of each axle. The lift axle indicator may be suppressed when air pressure is stabilized. Additionally, a graphical representation of data associated with statuses (e.g., air pressure, temperature) of each tire may be provided in a top-down view representation of the vehicle including its associated tire/axle configuration and the tire pressure for each tire. The graphical representation may be configured to
(Continued)

reflect the correct number of axles and tires per position, and may further include a tractor versus trailer designation.

14 Claims, 16 Drawing Sheets

Related U.S. Application Data filed on Feb. 19, 2020, provisional application No. 62/970,456, filed on Feb. 5, 2020, provisional application No. 62/970,516, filed on Feb. 5, 2020.

(51) Int. Cl.
    *B60C 23/00*     (2006.01)
    *B60C 23/04*     (2006.01)

(52) U.S. Cl.
    CPC .. *B60C 23/0416* (2013.01); *B60G 2204/4702* (2013.01); *B60K 2370/168* (2019.05); *B60K 2370/171* (2019.05); *B60K 2370/178* (2019.05)

(56) References Cited

U.S. PATENT DOCUMENTS

| | | | | |
|---|---|---|---|---|
| 6,571,481 | B1 * | 6/2003 | Weiss | B60C 23/06 33/336 |
| 8,695,998 | B1 * | 4/2014 | Karel | B60G 7/02 280/86.5 |
| 10,226,973 | B2 * | 3/2019 | Guinart | B60C 23/009 |
| 2009/0102635 | A1 * | 4/2009 | Massoni | B60C 23/009 340/443 |
| 2009/0326755 | A1 * | 12/2009 | Risse | B60K 37/06 701/1 |
| 2010/0328058 | A1 * | 12/2010 | Kanenari | B60C 23/008 340/447 |
| 2011/0210841 | A1 * | 9/2011 | Wang | B60C 23/061 340/443 |
| 2014/0354421 | A1 * | 12/2014 | Kosugi | B60C 23/0415 340/447 |
| 2015/0032287 | A1 * | 1/2015 | Duppong | B60C 23/00 701/1 |
| 2016/0288595 | A1 * | 10/2016 | Watanabe | G01L 17/00 |
| 2016/0297263 | A1 * | 10/2016 | Watanabe | B60C 23/0489 |
| 2016/0311273 | A1 * | 10/2016 | Zaroor | B60C 23/0474 |
| 2017/0124506 | A1 * | 5/2017 | Khan | G06Q 30/0282 |
| 2017/0308265 | A1 * | 10/2017 | Kim | B60K 35/00 |
| 2018/0236839 | A1 * | 8/2018 | Rasner | B60G 17/019 |
| 2019/0152453 | A1 * | 5/2019 | Tober | B60T 8/172 |
| 2020/0324588 | A1 * | 10/2020 | Yu | B60C 23/0442 |
| 2020/0331309 | A1 * | 10/2020 | Cyllik | B60C 23/0416 |
| 2020/0384813 | A1 * | 12/2020 | Honda | B60C 23/0474 |
| 2020/0406700 | A1 * | 12/2020 | Jovers | B60G 17/0523 |
| 2021/0078371 | A1 * | 3/2021 | Dickson | B60C 23/0416 |
| 2021/0237572 | A1 | 8/2021 | Jahns | |
| 2021/0237573 | A1 | 8/2021 | Jahns | |
| 2021/0237576 | A1 | 8/2021 | Jahns | |
| 2021/0239204 | A1 | 8/2021 | Jahns | |

FOREIGN PATENT DOCUMENTS

| | | | | |
|---|---|---|---|---|
| CN | 113580854 | A * | 11/2021 | |
| DE | 102004010384 | A1 * | 9/2004 | ......... F24F 11/0086 |
| DE | 102004019624 | B3 * | 12/2005 | ............ G01G 19/08 |
| DE | 102013222898 | A1 * | 5/2015 | ........... B60C 23/009 |
| DE | 102017108363 | A1 * | 10/2018 | ............ G01M 13/02 |
| DE | 102017123364 | A1 * | 4/2019 | ............ B60Q 1/115 |
| DE | 102020106755 | A1 * | 9/2021 | |
| DE | 102020123221 | A1 * | 3/2022 | |
| EP | 1361488 | A1 * | 11/2003 | ............ G08G 1/015 |
| EP | 1698535 | A2 * | 9/2006 | ........... B60T 13/665 |
| EP | 2105717 | A1 * | 9/2009 | .......... B60G 17/017 |
| EP | 2287020 | A1 * | 2/2011 | ........... B60C 23/007 |
| EP | 2057031 | B1 * | 6/2012 | ............ B60K 37/06 |
| EP | 2749437 | A1 * | 7/2014 | ........ B60C 23/0415 |
| GB | 2505943 | A * | 3/2014 | ........... B60C 23/009 |
| JP | 20110000521 | A * | 1/2011 | |
| JP | 2014032095 | A * | 2/2014 | |
| KR | 20140080973 | A * | 7/2014 | |
| KR | 101443155 | B1 * | 9/2014 | |
| KR | 2280357 | B1 * | 7/2021 | ............ B60C 23/02 |
| WO | WO-03044471 | A2 * | 5/2003 | ............ G01G 19/08 |
| WO | WO-2013139977 | A1 * | 9/2013 | ........ B60C 23/0416 |

* cited by examiner

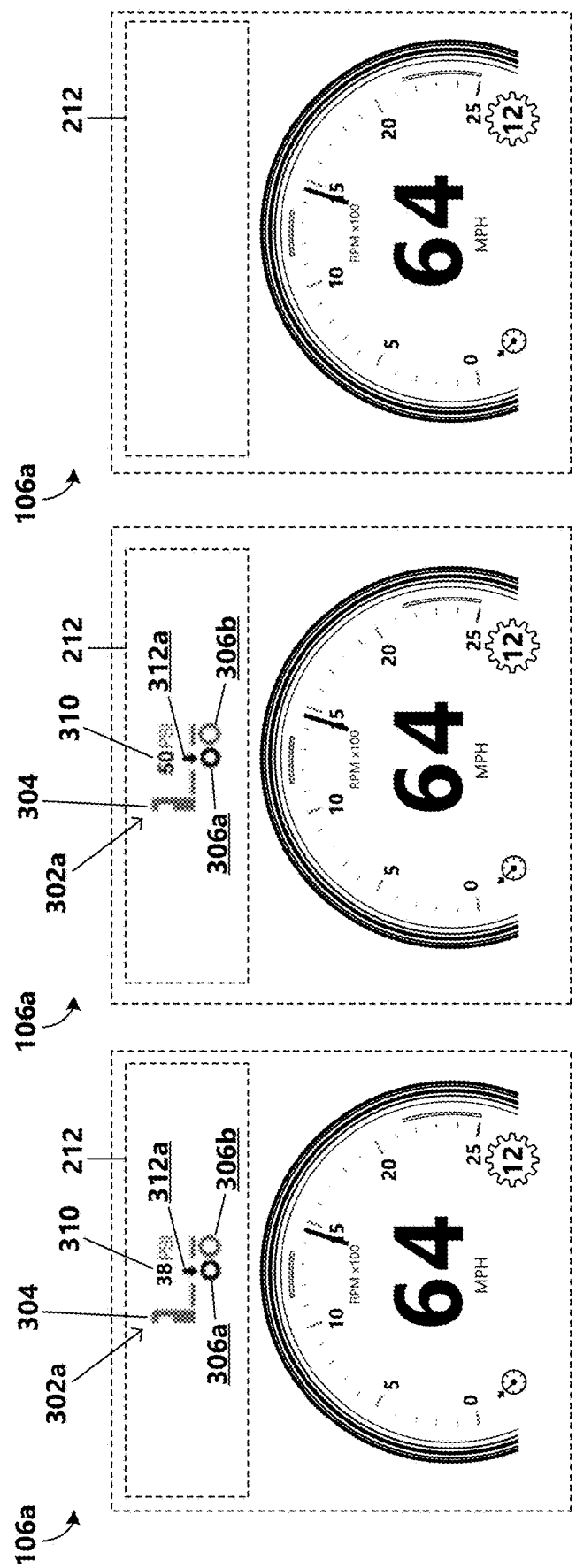

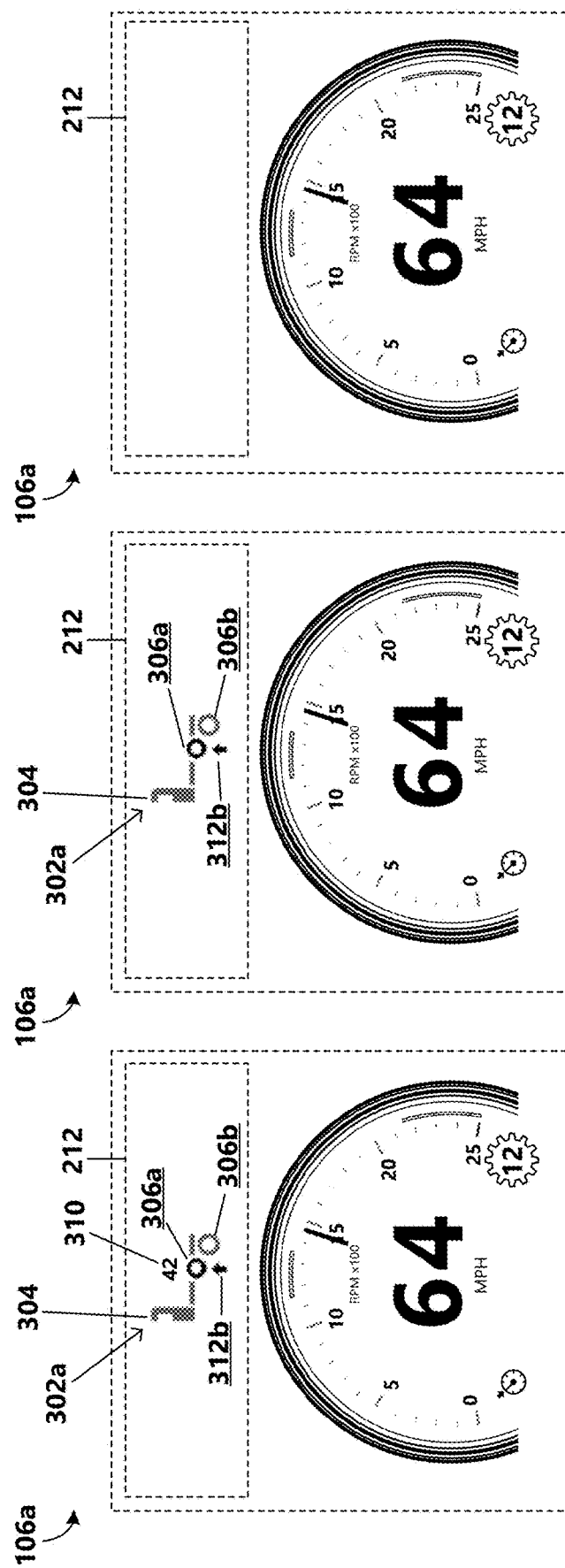

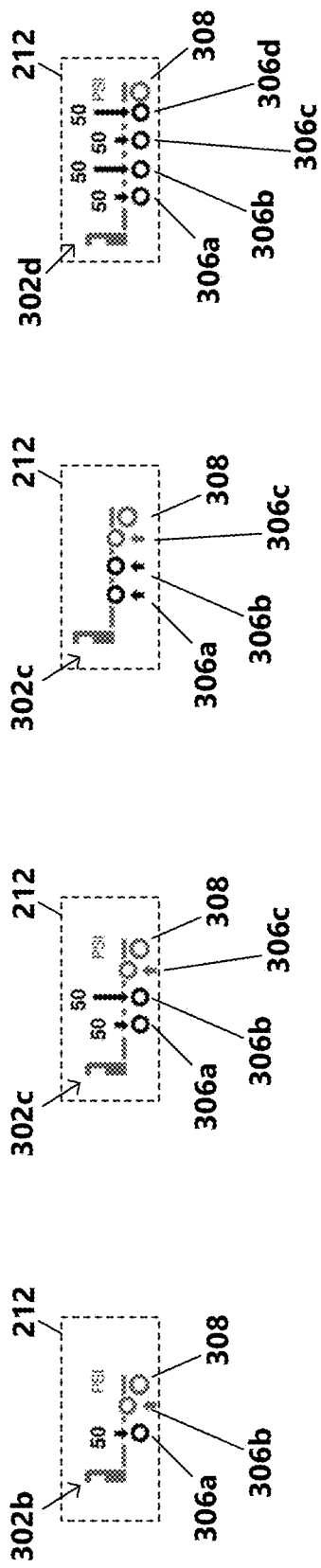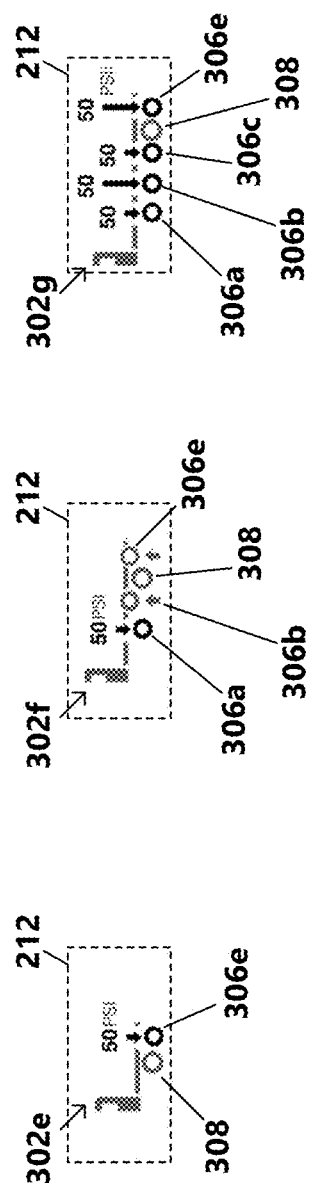

DYNAMIC CHASSIS AND TIRE STATUS INDICATIONS

CROSS-REFERENCE TO RELATED APPLICATIONS

This application claims the benefit of U.S. Provisional Application No. 62/970,516, having the title of "DYNAMIC TIRE AND CHASSIS STATUS INDICATION SYSTEM" and the filing date of Feb. 5, 2020, U.S. Provisional Patent Application No. 62/970,456, having the title of "DRIVER TASK ASSISTANCE AND PERFORMANCE COACHING SYSTEM" and the filing date of Feb. 5, 2020, U.S. Provisional Application No. 62/978,691, having the title of "INSTRUMENT CLUSTER USER INTERFACE" and the filing date of Feb. 19, 2020, and U.S. Provisional Application No. 62/978,698, having the title of "INSTRUMENT CLUSTER USER INTERFACE" and the filing date of Feb. 19, 2020, which are incorporated herein by reference in their entireties.

BACKGROUND

A dashboard on a vehicle may include various gauges and instruments for allowing a driver to monitor the vehicle engine's performance and the statuses of various other vehicle components. In one example, on some vehicles, such as heavy trucks, additional axles may be added that can be raised and lowered to distribute the vehicle weight more broadly. For example, vehicle weight may need to be distributed amongst additional axles due to weight limit regulations and/or vehicle component weight limitations. These additional axles may include either 'pusher' or 'tag' axles depending on if they are mounted before or after the fixed axles, respectively, and are lowered via air pressure. In various circumstances, the driver may need to know, and therefore monitor the pressures and statuses of the additional axles (e.g., up or down) (i.e. some are automated and not directly controlled), and which amongst multiple axles the status information is coming from. Additionally, in some cases, the driver may need to be notified of pressure loss of an additional axle.

It is with respect to these and other general considerations that embodiments have been described. While relatively specific problems have been discussed, it should be understood that the embodiments should not be limited to solving the specific problems identified in the background.

SUMMARY

The disclosure generally relates to systems, methods, and computer readable storage media for providing dynamic chassis and tire status indications via a full or partial digital instrument cluster display. In some examples, the instrument cluster may be implemented in a medium or heavy duty truck.

According to one example aspect of the present disclosure, data associated with status of a vehicle's chassis, which may include a plurality of lift axles, may be consolidated into a single display area in the digital instrument cluster display. For example, lift axle status data, which may include such information as a position (e.g., up or down), current pressure, and an air pressure setting of a lift axle, may be graphically represented by a lift axle indicator. The lift axle indicator may be dynamically provided in a shared notification/messaging space location during a lift axle transition, when a state change of a lift axle occurs, or when at certain speeds. In some examples, the shared notification/messaging space may be positioned within or near the driver's line of sight. The lift axle indicator may further be configured to self-suppress when air pressure is stabilized. Not only can this simplify the graphic presentation and allow other information to be displayed in the shared notification/messaging space on the screen, but additionally, the driver may be proactively informed of a relevant state change and may not be required to continually monitor axle air pressure status. For example, if the lift axle indicator comes into view on the display when the driver doesn't expect it (e.g., a pressure loss may trigger a 'lift signal' which may cause the lift axle indicator to be displayed), the driver's attention may be captured for the relevant lift axle information. In some examples, the lift axle indicator may include a visual representation of the vehicle axles, and may be specific to the particular vehicle and trailer configuration. The digitally represented lift axle indicator may help to improve the driver's awareness of relevant lift axle status information over a traditional needle dial gauge that may be outside of the driver's line of sight.

According to another example aspect of the present disclosure, a graphical representation of data associated with statuses (e.g., air pressure, temperature) of each tire of a vehicle may be provided in the digital instrument cluster display. In one example, the graphical representation is a top-down view representation of the vehicle including its associated tire/axle configuration and the tire pressure for each tire. The graphical representation may be configured to reflect the correct number of axles and tires per position, and may further include a tractor versus trailer designation.

As can be appreciated, the indicators and graphical representations provide an intuitive and easily-understandable/interpretable indication of the statuses of the vehicle's chassis and tires that minimize mental translations that a driver may need to perform, and therefore the amount of time required for the driver to understand relevant and important vehicle status issues.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures:

FIG. 3A is an illustration of a popup notification including an indication of a lift axle state change;

FIG. 3B is an illustration of a popup notification including an indication of a lift axle state change;

FIG. 3C is an illustration of the popup notification removed from display after a timeout period;

FIG. 3D is an illustration of a popup notification including an indication of a lift axle state change;

FIG. 3E is an illustration of a popup notification including an indication of a lift axle state change;

FIG. 3F is an illustration of the popup notification removed from display after a timeout period;

FIGS. 3G-M are illustrations of example lift axle indicators representing various lift axle states and vehicle configurations;

DETAILED DESCRIPTION

Figure 1A:
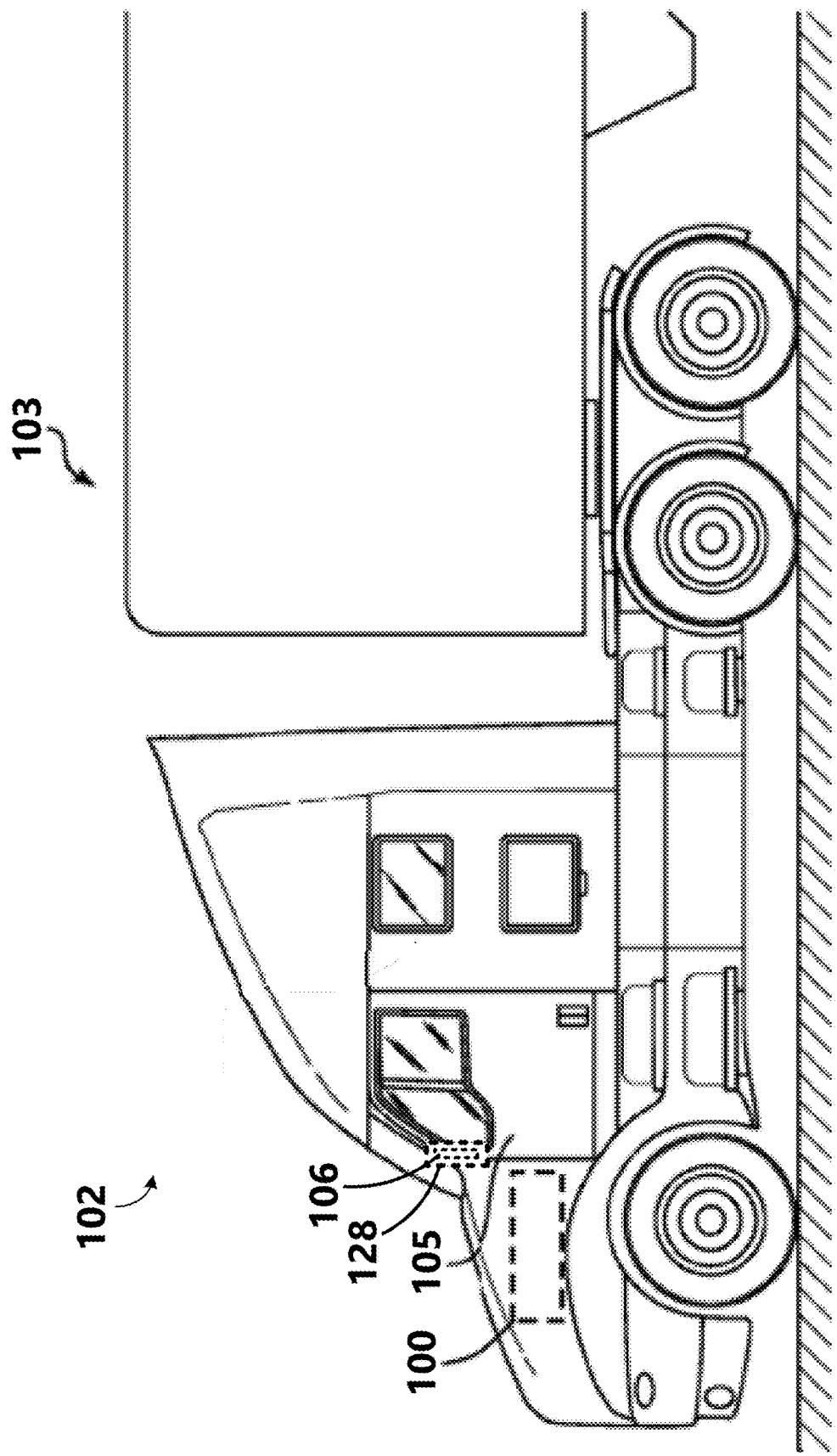
FIG. 1A is an illustration depicting a side view of an example vehicle.

Aspects of the present disclosure are generally directed to systems, methods and computer readable storage media for providing dynamic chassis and tire status indications. The detailed description set forth below in connection with the appended drawings is an illustrative and non-limiting description of various embodiments of the disclosed subject matter. Wherever possible, the same reference numbers are used in the drawings and the following description to refer to the same or similar elements. In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. The illustrative examples provided herein are not intended to be exhaustive or to limit the claimed subject matter to the precise forms disclosed.

While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

The following description proceeds with reference to examples of systems and methods suitable for use in vehicles, such as Class 8 trucks. Although illustrative embodiments of the present disclosure will be described hereinafter with reference to vehicles, it will be appreciated that aspects of the present disclosure have wide application, and therefore, may be suitable for use with many types of vehicles, such as trucks, passenger vehicles, buses, commercial vehicles, light and medium duty vehicles, etc.

Traditional presentation of indications of axle pressures are provided by a separate traditional moving needle-on-a-scale type gauge for each axle. For example, a truck with three pusher axles and a tag lift axle may therefore have four gauges that the driver may need to monitor and that consume space on the dashboard. The separate gauges are oftentimes not arranged in an orientation that matches the chassis configuration, so the driver may have to rely on small labeling of individual graphic symbols or text labels to know which axle is reporting which pressure. The driver may further need to also assimilate the position of a separate switch to determine if the axle is up or down, as the air pressure system is used to both hold the axle up, and apply pressure to push it onto the ground. The pressure reading on a traditional gauge alone might not be enough to fully understand the position state of the axle. Further, traditional placement of these gauges is typically not front and center to the driver's vision (e.g., off to the right or left, down by the driver's seat so as only viewable from the outside of the vehicle with the door open, or outside).

In another example, tire monitoring (both pressure and temperature) and tire related costs/issues are among top challenges faced by vehicle (e.g., trucking) fleets. Having an on-board monitoring system can enhance driver situational awareness, which can help in avoiding critical scenarios such as blow-outs and even fires caused by overheating brakes or axle bearings. Typical medium/heavy truck tire monitoring systems may include a digital display that may be configured to provide a general indication of a tire issues. However, due in part to various possible trailer configurations that a truck may be able to pull, the indication may not provide information as to which tire may have an issue or specifically if the issue is pressure vs. temperature related, or how critical the issue is. Moreover, current systems may only show a single axle at a time, wherein, the driver may need to toggle the display axle-by-axle and, in some cases, tire-by-tire in order to determine which tire may have an issue. As can be appreciated, the driver may need to divert attention to the display, which can be a safety issue.

As can be appreciated, to ensure that a driver is able to be quickly and easily informed of axle status, axle pressure issues, and tire pressure and temperature issues, it may be advantageous to present axle state information to the driver in a way such that driver distraction is minimized and ease of viewing and understanding the information is maximized.

FIG. 1A depicts a side view of a vehicle 102. The vehicle 102 may be a part of a tractor-trailer combination, which may include the vehicle 102 having a so-called fifth wheel by which a box-like, flat-bed, or tanker semi-trailer 103 (among other examples) may be attached for transporting cargo or the like. While the vehicle 102 is depicted as a truck in FIG. 1A, it should be appreciated that the present technology is applicable to any type of vehicle where a flexible and variability-accommodating instrument cluster display is desired.

The example vehicle 102 includes a cabin 105 from which a driver may operate the vehicle 102. The cabin 105 includes a display screen 128 on which a flexible and variability-accommodating instrument cluster 106 may be displayed. According to one aspect, the instrument cluster 106 is configured to provide vehicle status-related information to the driver of the vehicle 102. Vehicle status indications included in the displayed instrument cluster 106 and display attributes of the vehicle status indications may be determined by a notification system 100 of the vehicle 102. Components and operations of an example notification system 100 is discussed in further detail below.

Figure 1B:
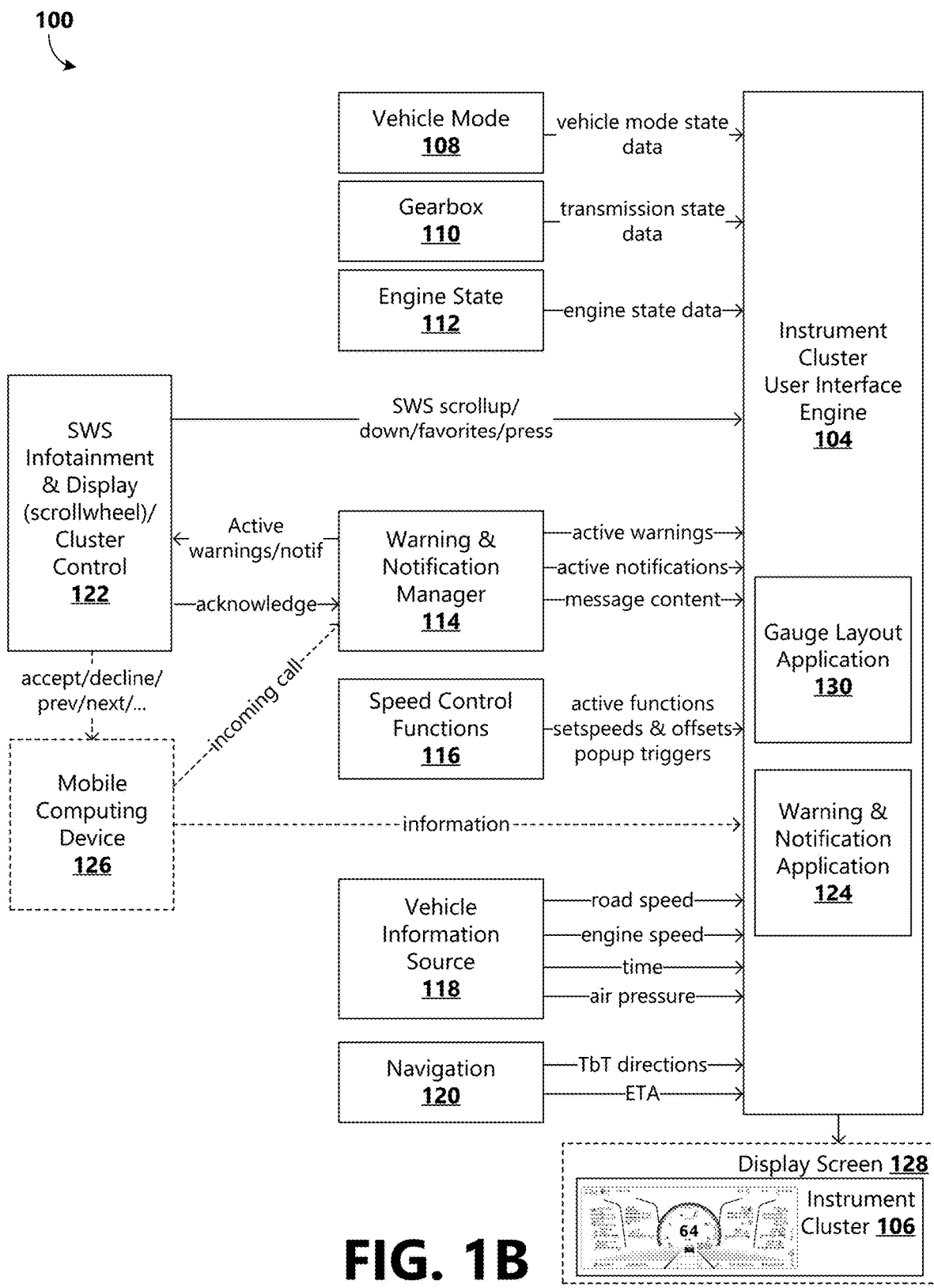
FIG. 1B is a block diagram of an example system of the present disclosure according to an embodiment.

With reference to FIG. 1B, a schematic block diagram is provided of an example notification system 100 in which aspects of the present disclosure can be implemented. For example, some or all of the elements included in the notification system 100 may be embodied in the vehicle 102. The example notification system 100 includes various data sources in communication with an instrument cluster user interface (UI) engine 104. In some examples, the vehicle 102 is a medium or heavy duty truck. According to an aspect, the instrument cluster UI engine 104 is illustrative of a software module, system, or device that is operative or configured to receive various signal inputs from a plurality of data sources and provide a flexible and variability-accommodating instrument cluster 106 for display on a display screen 128 included in the vehicle 102. According to one aspect, the instrument cluster 106 is configured to provide vehicle status-related information to the driver of the vehicle 102. According to an aspect, the instrument cluster UI engine 104 may include or be communicatively connected to a gauge layout application 130 comprising logic rules and layout rules that may be used by the instrument cluster UI engine 104 to select inclusion, form, and placement of content in the instrument cluster 106.

In some examples, vehicle status-related information may be presented in the form of gauges and indicators, such as a lift axle status indicator and a tire pressure monitoring system (TPMS) indicator, that provide a visual display of component and operating statuses associated with the vehicle 102. Because at least a portion of the instrument cluster 106 can be display-based, gauges can be utilized to communicate various attributes of vehicle status-related information and driver notifications, which was not previously possible with only physical needles and dials with lights. For example, a gauge or indicator may be shown in various display states comprising different presentation attributes that may convey different criticality levels. Example gauge states include an on-screen within-parameter state, a hidden within-parameter state, an out-of-parameter state, a warning state, and a magnitude only state.

According to an aspect, the instrument cluster UI engine 104 may include or be communicatively connected to a warning and notification application 124 comprising logic rules and display rules that may be used by the instrument cluster UI engine 104 to select inclusion, type, and properties of warnings and notifications in the instrument cluster 106. In some examples, vehicle status-related information may be presented in the form of a warning or message when a measurement is out-of-parameter or in a warning state, and the warning/notification may be in the form of a popup notification. A popup notification may be selected for display and display attributes of the popup notification may be based on a combination of safety relevance, operational relevance, and timeframe. A popup notification may be displayed in the instrument cluster 106 in a defined space and according to a format template (e.g., icon, color, and text) that may convey a system/component in an out-of-parameter or warning state needing the driver's attention, and, in some examples, may include command level language informing the driver of an action to perform based on the associated out-of-parameter/warning state measurement.

The plurality of data sources may include any suitable data source, unit, or sensor operative to provide various data or signaling information that may be used by the instrument cluster UI engine 104 to provide vehicle status-related information via the instrument cluster 106. The plurality of data sources can include, but are not limited to, a vehicle mode data source 108, a gearbox data source 110, an engine state data source 112, a warning and notification manager 114, a speed control function data source 116, a vehicle information data source 118, a navigation data source 120, and steering wheel switch (SWS) infotainment and display actuation data sources (e.g., via a scrollwheel, dial, touchscreen, or other actuator (referred to herein as a cluster control 122). In some examples, another data source may include a mobile computing device 126 in communication with the instrument cluster UI engine 104. As can be appreciated, in other examples, additional or alternative data sources are possible and are within the scope of the present disclosure.

In an example aspect: the vehicle mode data source 108 is operative to provide vehicle mode state data; the gearbox data source 110 is operative to provide transmission state data; the engine state data source 112 is operative to provide engine state data; the warning and notification manager 114 is operative to provide information associated with active warnings, active notifications, and message content; the speed control function data source 116 is operative to provide information associated with active functions, set-speed values, offset values, and popup triggers; the vehicle information data source 118 is operative to provide information associated with the vehicle's road speed, engine speed, and air pressure, and time; the navigation data source 120 is operative to provide turn-by-turn direction information and estimated arrival time (ETA) information in association with a navigable route; the cluster control 122 is operative to enable the driver to navigate between views, menus, and list items; suppress suppressible popup notifications, etc.

The cluster control 122 may be provided in different configurations. In some examples, the cluster control 122 may include a scrollwheel. In other examples, the cluster control 122 may include a rotatable dial control. According to an aspect, the cluster control 122 may be located on a steering wheel, and an ability to easily transition between content views, including an ability to change the number of gauges displayed in the instrument cluster 106, may be provided by a simple thumb-scroll or rotation of the cluster control 122. In other examples, the cluster control 122 may be included in a touchscreen interface. In some examples, the instrument cluster 106 may be utilized for providing a selectable amount of (within-parameter) information to a driver of the vehicle 102, wherein the driver may be provided with an ability to control the visual workload. For examples, rather than simply replacing one digital gauge for another, scrolling to another content view may expand a display of gauges from a minimal view to a maximum number (e.g., minimized content view to basic content view to enhanced content view).

Figure 2A:
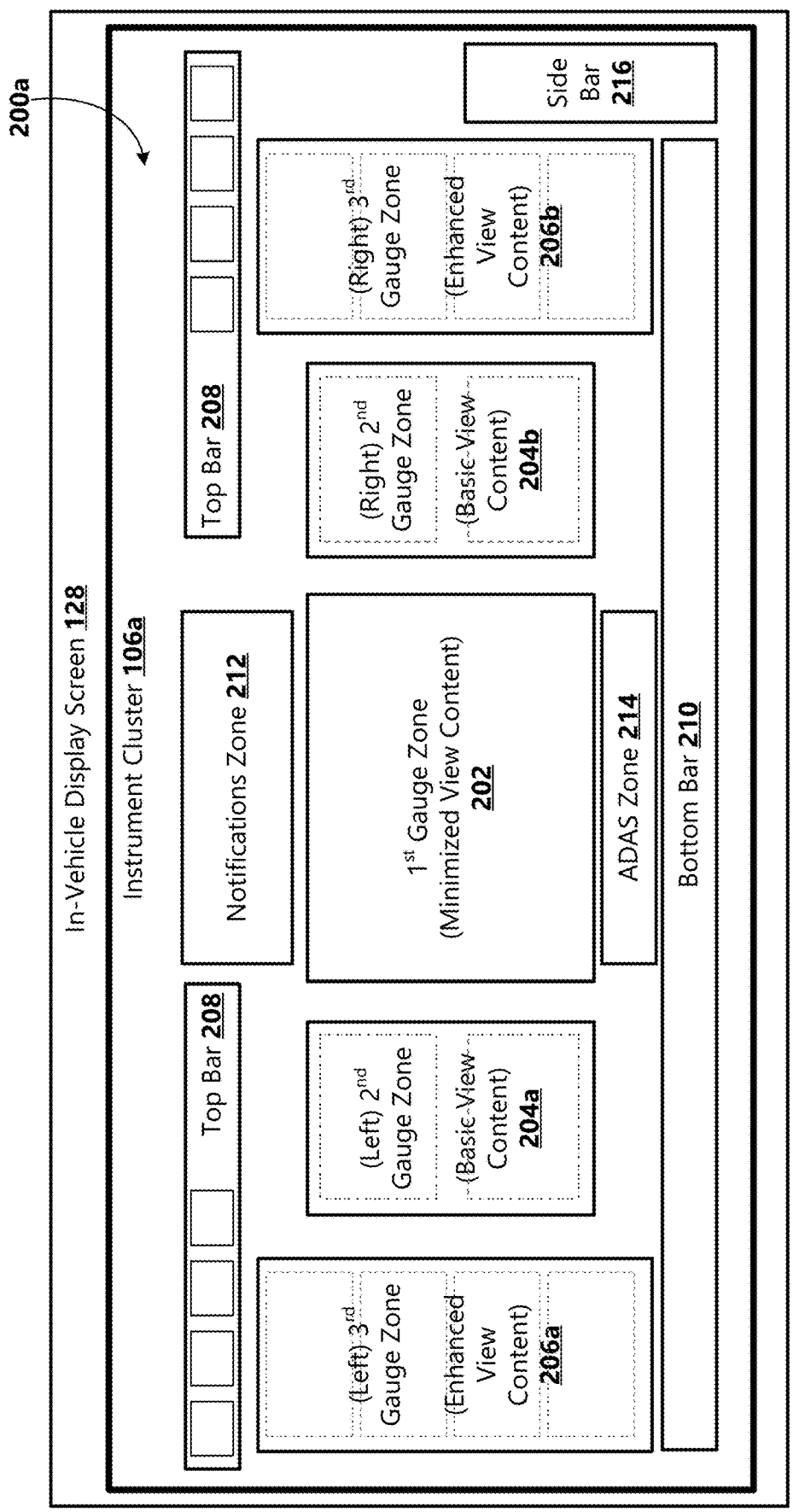
FIG. 2A is a schematic diagram of an example instrument cluster according to an embodiment.

With reference now to FIG. 2A, an example layout 200a of an instrument cluster 106a displayed on an in-vehicle display screen 128 is shown according to a first embodiment. For example, the layout 200a of the instrument cluster 106a may comprise a plurality of content display zones 202-216 that may be displayed or hidden based on a user-selected content view. According to an example aspect, the layout 200a of the instrument cluster 106a may include a first gauge zone 202 that may be shown in a minimized content view, in a basic content view, and in an enhanced content view, second gauge zones 204a,b (generally 204) that may be hidden in the minimized content view but shown in the basic content view and in the enhanced content view, and a third gauge zone 206a,b (generally 206) that may be hidden in the minimized content view and in the basic content view but shown in the enhanced content view. In some examples, a favorites function may be provided that allows for a driver-selectable set of gauges to be configured as a personalized favorites screen/view. For example, in a favorites setup process, the driver may choose one or more gauges to include in the second gauge zones 204 and/or the third content zones 206. In some examples, a plurality of favorites views and other settings may be stored in association with a plurality of drivers.

According to an aspect, the second gauge zones 204 and the third gauge zones 206 may each comprise one or more containers (as indicated by the dotted outlines) configured to hold single, super, and/or combo gauges based on a set of layout rules. For example, the set of layout rules may dictate which types of gauges can be displayed in a particular container, which gauges may be combined into a super gauge and share a same scale, which gauges may be related and can be brought together in a combination (combo) gauge that may or may not share a same scale, whether a gauge is displayed in a compact version or a normal/long version, etc. For example, a gauge may be shown in different formats to conserve display area by either combining gauge functions or by compressing the gauge information to make room for additional gauges to be displayed.

In some examples, vehicle status-related information that may be included in the first gauge zone 202 may include a minimal set of gauges including at least a display of information associated with the vehicle's road speed (i.e., a speedometer) and the vehicle's engine speed (i.e., a tachometer).

In some examples, vehicle status-related information that may be included in the second gauge zones 204 include a display of basic view gauges, such as: one or more air pressure gauges, one or more oil pressure gauges, one or more fuel level gauges (which may optionally include a diesel exhaust fluid (DEF) level gauge), and one or more water temperature gauges, while suppressing a display of additional gauges that may be within normal usage ranges (e.g., as opposed to out-of-parameter or warning ranges).

In some examples, vehicle status-related information that may be included in the third gauge zones 206 may be specific to the vehicle build configuration and priorities of available gauges. In some examples, the instrument cluster UI engine 104 may include or be communicatively connected to the gauge layout application 130 comprising logic rules (e.g., a priority level, warning state, included in a super or combo gauge) and layout rules that may be used by the instrument cluster UI engine 104 to select inclusion and placement of available gauges in the maximized enhanced content view. Examples of available gauges that may be included in the third gauge zone include: a brake application gauge(s) (e.g., truck and trailer brake application), an engine oil temperature gauge, air suspension gauge(s), a torque gauge(s), a boost gauge, a transmission oil temperature gauge, an air filter gauge, a steering axle temperature gauge, a front-rear axle temperature gauge, a center-rear axle temperature gauge, a rear-rear axle temperature gauge, a fuel filter restriction gauge, an auxiliary transmission temperature gauge, a transfer case oil temperature gauge, an electric current/ammeter gauge, and a trailer reservoir pressure gauge. In some examples, in the favorites view, the driver may be enabled to select which available gauges to include in gauge containers in the second gauge zones 204 and the third gauge zones 206 based on the layout rules.

Other elements that may be included in the layout 200a of the instrument cluster 106a and that may be persistently displayed when the vehicle 102 is in a drive mode may include a top bar 208, a bottom bar 210, a side bar 216, and a notifications zone 212. In some examples, the top bar 208 may include a display of one or more of the following information elements: a voltmeter, a clock, an active warning indicator (e.g., indicating a number of active critical red warnings and amber warnings), an outside temperature indicator, and a diesel particulate filter (DPF) status indicator. In some examples, the bottom bar 210 may include a display of one or more of the following information elements: an odometer, a trip odometer, a sub-trip odometer, and engine power take-off (PTO) hours indicator (e.g., if the vehicle 102 is equipped with a PTO system). In some examples, the side bar 216 may include a display of a pagination indication of the drive view (e.g., an indication of an active content view page in relation to a set of content view pages) and a drive mode indication (e.g., an indication of a control position of the active gear: drive, neutral, reverse).

In some examples, the notifications zone 212 may include suppressible or non-suppressible popup notifications when a fault or a need to message the driver is triggered, and may further include a selectable display of information associated with information sources such as: entertainment/radio, a communicatively-connected mobile computing device 126 (e.g., mobile phone, music device), and navigation system 120. In some examples, the notifications zone 212 is persistently displayed in each content view mode. For example, the notifications zone 212 may provide a dedicated location to show a variety of warning, convenience, or other informational type messaging to the driver. Popup warning/notification messages displayed in the notifications zone 212 and other messaging may be selected based on determinations made by the warning and notification application 124 and gauge layout application 130. For example, the notification zone 212 may be a reconfigurable area that allows for reusing screen space in the vehicle 102 for providing information from a range of data sources beyond that of just warnings (e.g., turn-by-turn instructions, phone status, smartphone-enabled application, current song, artist).

In some examples, the content display zones included in the layout 200a of the instrument cluster 106a may further include an advanced driver-assistance system (ADAS) zone 214. The ADAS zone 214 may be provided when the vehicle 102 is configured with an ADAS and the ADAS is active, and may include a display of passive and/or active driver assistance information, settings, and warnings. In some examples, the ADAS zone 214 is persistently displayed in each content view mode. As should be appreciated, additional and/or alternative information elements may be displayed in the instrument cluster 106a and are within the scope of the present disclosure.

Figure 2B:
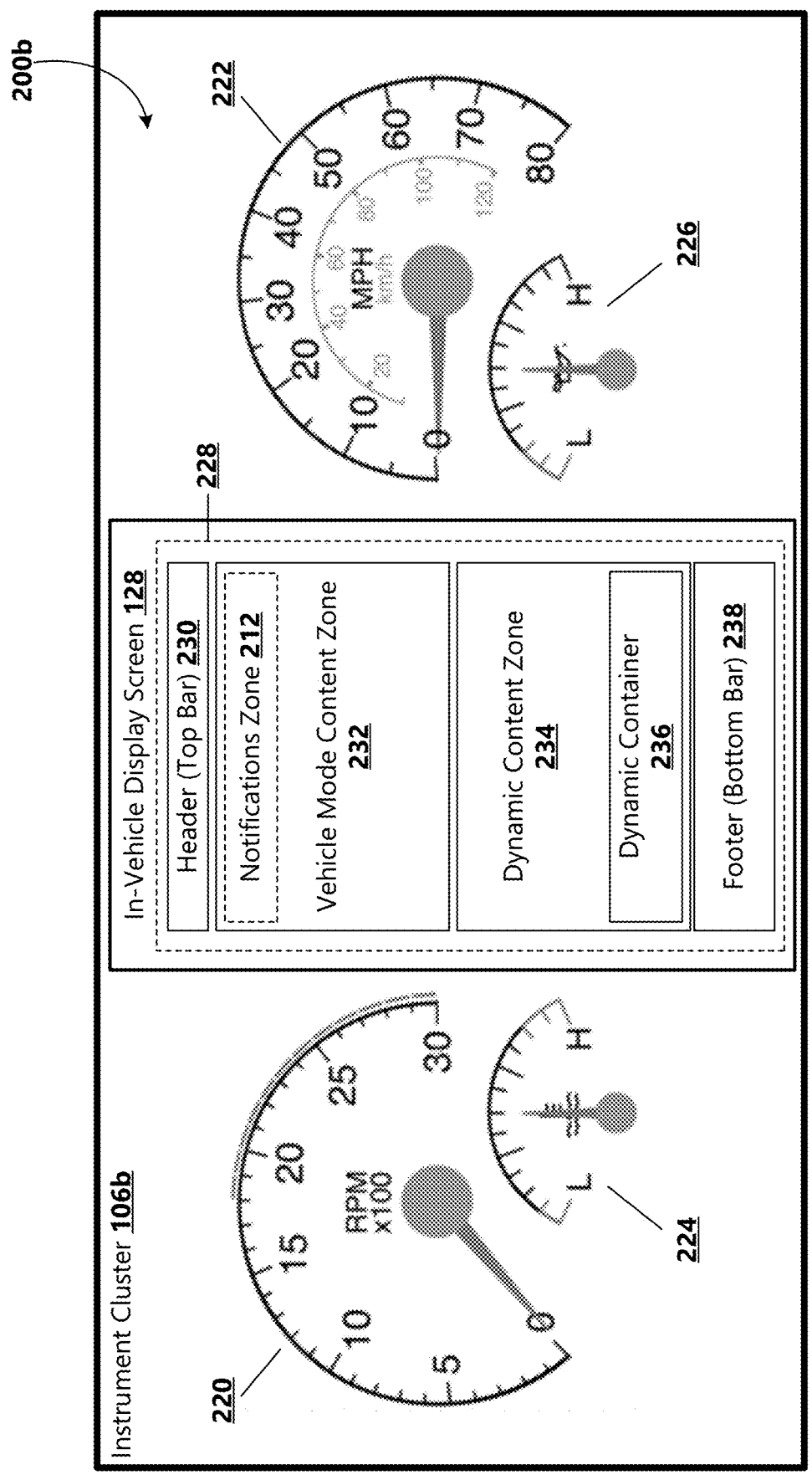
FIG. 2B is a schematic diagram of an example instrument cluster according to another embodiment.

With reference now to FIG. 2B, another example layout 200b of an instrument cluster 106b according to a second embodiment is shown. In some examples, the layout 200b of the instrument cluster 106b may comprise a combination of physical gauges and a digital display of vehicle status information on an in-vehicle display screen 128. According to one example, the physical gauges may include a tachometer 220, a speedometer 222, an engine coolant temperature gauge 224, and an oil pressure gauge 226, and the digital display may include a display of a plurality of display screens, sometimes referred to herein as cards 228. In other examples, one or more of the tachometer 220, speedometer 222, engine coolant temperature gauge 224, and oil pressure gauge 226 may be embodied as digital displays.

The cards 228 may include various display zones. In one examples, a card 228 may include a header or top bar 230, a vehicle mode content zone 232, a dynamic content zone 234, and a footer or bottom bar 238. For example, the top bar 230 may include a set of persistent content positioned across the top of the screen 128. The vehicle mode content zone 232 may include content specific to the vehicle's current mode (e.g., drive versus park) and state (e.g., active versus inactive). In some examples, the vehicle mode content zone 232 may include a digital speedometer, cruise control functions, engine brake information, an ADAS zone, and a plurality of digital telltale slots. In some examples, when a determination is made to provide a popup notification (described in further detail below), the popup notification may be displayed in a notifications zone 212 located in a top portion of the vehicle mode content zone 232. For example, the notifications zone 212 may be in a location central to the driver's field of vision on the instrument cluster 106b. The dynamic content zone 234 may include specific content unique to the card 228, which may include gauges, custom setup options, ADAS features, a TPMS indicator, menu options, and/or trip information. The bottom bar 238 may include vehicle-specific fuel gauge configurations.

According to an aspect, the gauge layout application 130 may comprise logic rules and layout rules that may be used by the instrument cluster UI engine 104 to select inclusion and placement of available gauges in the dynamic content zone 234. In some examples, different formats may be used to conserve display area by either combining gauge functions or compressing the gauge information to make room for additional gauges to be displayed. For example, a gauge displayed in the dynamic content zone 234 may be in a single gauge format (e.g., one gauge function displayed individually), a double gauge format (e.g., two gauge functions displayed together), or a compact gauge format (gauges that have elements removed). Example indicators and notifications are described in further detail below with reference to example instrument cluster 106 UI examples shown in FIGS. 3A-N, 4, and 5A-E.

In some examples, a vehicle 102 may include one or more lift axles. For example, a lift axle may be selectively utilized to distribute the vehicle's load across additional axles to stay within safe operating limits of the vehicle's tires and to reduce damage caused to road surfaces. In some examples, operating limits may be defined by state regulations. A lift axle may be a pusher axle (i.e., located in front of a fixed axle) or a tag axle (i.e., located behind a fixed axle). A lift axle may be lowered via air pressure. The amount of air pressure used to lower a lift axle may be pre-calibrated based on a trip (e.g., trailer configuration, load weight, location/route). For example, the driver may use a scale and add pressure to a particular lift axle to lower the lift axle and cause the lift axle's tires to engage the road surface, thus reducing the per-axle weight on the road surface to an allowable operating limit. The driver may use a regulator to adjust the amount of air pressure applied to a lift axle to adjust the lift axle weight on the scale. The air pressure amount that is set by the driver may be set and stored as a default air pressure value.

In various circumstances, the driver may need to know, and therefore monitor, the pressures and statuses of the lift axles and which amongst multiple axles the status information is coming from. Additionally, in some cases, the driver may need to be notified if a lift axle's air pressure is outside of a threshold of the default air pressure value. For example, a loss of pressure may cause the lift axle to be unintentionally lifted, and additional weight may be placed on the vehicle's other axles. As can be appreciated, this may cause the vehicle to be out of compliance with regulations. Accordingly, the driver may need to be aware of the air pressure loss.

Figure 3N:
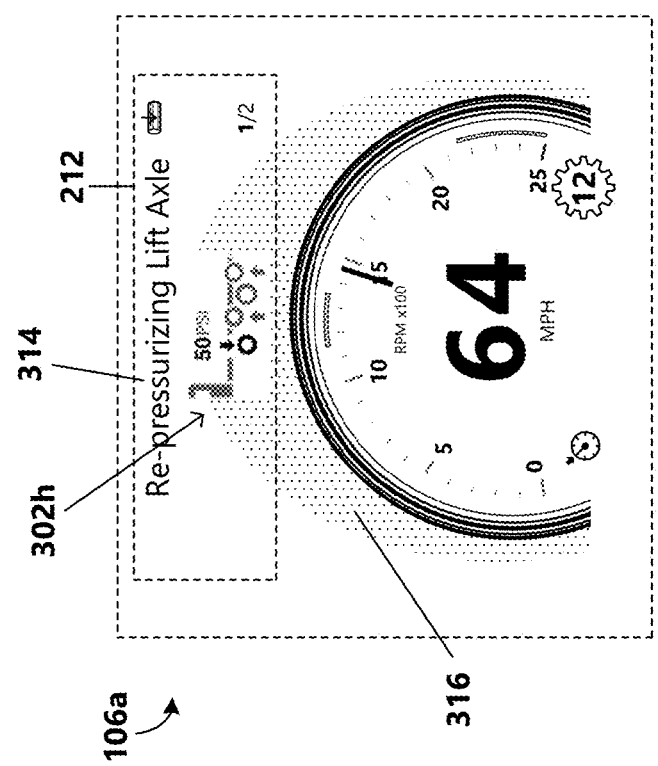
FIG. 3N is an illustration of a popup notification including an indication of a lift axle state change.

According to an example aspect of the present disclosure, a lift axle indicator 302 including a graphical representation of data associated with statuses of one or more lift axles included in the vehicle's 102 chassis may be dynamically displayed in a digital instrument cluster 106. For example, one or more lift axle controls may provide state information and each lift axle on the vehicle 102 may include one or more sensors that may be configured to collect and provide pressure measurements. Various example lift axle indicators 302a-h are illustrated in FIGS. 3A-N. The lift axle indicator 302 may be automatically displayed as a popup notification in the notification zone 212 when an actuation of a pusher switch/dial associated with a lift axle is received and/or when a change in lift axle pressure is sensed without the appropriate switch application. For example, the lift axle indicator 302 may be displayed after a state transition or, in some examples, when at certain speeds. According to an aspect, filtering logic may be utilized on lift axle pressure readings to prevent unnecessary triggering the display of the lift axle indicator 302. For example, lift axle pressure readings may fluctuate with road inputs. Accordingly, a threshold may be associated with a lift axle pressure reading, and when the reading fluctuates outside the threshold, the lift axle indicator 302 may be triggered.

According to an aspect, the lift axle indicator 302 includes a pictorial representation of the lift axles, which enables the driver to quickly and easily understand the status of the vehicle's lift axles. The lift axle indicator 302 may comprise a plurality of individual axle sections in various configurations. In some examples, the lift axle indicator 302 includes a side-view graphical representation of the vehicle 304 and a representation of the status of each axle in relation to the vehicle representation 304. In some examples, a representation of the status of a lift axle includes a representation of the number and location(s) of the lift axle(s) in relation to a fixed axle. For example, each lift axle section 306a-n (generally 306) may represent a pusher lift axle (e.g., shown in front of a fixed axle section), or a tag lift axle (e.g., shown behind a fixed axle section). In some examples, the vehicle representation 304 may include a designation between a truck/tractor portion and a trailer portion of the vehicle 102.

The configuration of the lift axle indicator 302 may vary based on various vehicle (e.g., truck/trailer) axle configurations. That is, a vehicle 102 may be configured with a variable number and layout of pusher lift axles and/or tag lift axles, and the lift axle sections 306 included in the lift axle indicator 302 may correspond with the vehicle's axle configuration. Pusher and tag lift axle sections may be visually distinguishable from a fixed axle section 308. For example, a fixed axle section 308 may be slightly larger in size and may be shown located under a portion of the vehicle representation 304 (e.g., below a trailer portion of the vehicle). In some examples, a single fixed axle section 308 may be displayed (e.g., even if there are two or three fixed axles) to conserve display space. In some examples, when the lift axle indictor 302 is displayed and a lift axle is in an inactive state, the associated lift axle section 306, and an indication of the inactivity may be displayed. For example, the associated lift axle section 306 (and the non-liftable fixed axle section 308) may be displayed in a color or shade that is less pronounced than an active lift axle section. A lift axle may be in an inactive state when in a lifted/unused position and when a lift axle actuator has not been actuated. The example lift axle indicator 302a illustrated in FIGS. 3A,B,D,E includes a single pusher lift axle section 306a located in front of a fixed axle section 308.

In some examples, the representation of the status of a lift axle includes a representation of a current air pressure reading of the lift axle. For example, an air pressure measurement 310 may be shown in relation to the lift axle section 306 and may be dynamically updated to represent the current measured air pressure. The air pressure measurement 310 may be selectively displayed in US customary (PSI) or metric (bars) units. In some examples and as shown in FIGS. 3A-B, when a lift axle is being lowered, the air pressure measurement 310 may dynamically increase on that circuit until it reaches a stable/steady state air pressure measurement (i.e., the pre-calibrated default air pressure value). In some examples, when a lift axle is being lifted, the air pressure measurement 310 may dynamically decrease until it reaches a value of 0 on that pressure circuit. In alternative examples, an air pressure measurement 310 may not be displayed when a lift axle is in a transitionary state (i.e., when the axle is being raised or lowered).

The example lift axle indicator 302a illustrated in FIG. 3B includes an air pressure measurement 310 with a value of 50 PSI displayed above the pusher lift axle section 306a. For example, if the default air pressure value is 50 PSI, the example lift axle indicator 302a as shown in FIG. 3B may be displayed when the vehicle 102 has a single pusher axle that has been placed down at 50 PSI. According to another aspect, the lift axle indicator 302 may be self-suppressing. For example and as shown in FIG. 3C, when the air pressure measurement 310 reaches a steady state, after a time out period (e.g., 5 sec, 10 sec), the lift axle indicator 302 may be automatically removed from display, which can allow other information to be displayed in the shared messaging space (i.e., the notification zone 212) on the screen 128. When a change in the pressure is recognized, the lift axle indicator 302 with the changed air pressure measurement 310 may be re-displayed. As can be appreciated, not only can this simplify the graphic presentation, but also, the driver may be proactively informed of a relevant state change and may not need to continually monitor axle air pressure statuses.

In some examples, to provide further understanding of the state of the lift axles, the representation of the status of a lift axle may further include a representation of a position of the lift axle. For example, based on whether the lift axle is being lifted or lowered, the lift axle section 306 may be displayed as lifted or lowered, respectively, in relation to the vehicle representation 304 and other axles. The example lift axle indicator 302a illustrated in FIGS. 3A,B is displayed in a lowered position, which may indicate that the associated lift axle is being lowered or has recently been lowered. In some examples, an arrow 312 may also be shown in relation to a lift axle section 306 and may point in the direction that the lift axle is positioned or in the direction that the lift axle is currently being moved. In some examples, a length of the arrow 312 may be animated to indicate movement of the associated lift axle. In other examples, arrows 312 may vary in length to accommodate an inclusion of multiple air pressure measurements 310 corresponding to multiple lift axles on a vehicle 102 (as shown in FIG. 3H,J,M,N). In general, drivers are primarily interested in knowing the pressure value being applied to axles in the downward configuration. They are less concerned with the system pressures to raise an axle and generally are then only interested in knowing position status, not pressure.

As an example, when a down arrow 312a is displayed with an air pressure measurement 310, such as shown in FIGS. 3A,B,J-N, the driver may be able to easily interpret whether the lift axle is being lowered (e.g., dynamically increasing air pressure values may indicate that the lift axle is being lowered) or has reached its default air pressure value (e.g., a stable air pressure measurement of the default air pressure value may indicate that the lift axle has been lowered). For example, if the default air pressure value is 50 PSI, and the air pressure measurement 310 increases to and then remains at the default air pressure value, the driver can quickly determine that the associated lift axle has been lowered to its lowered position. Further, as mentioned above and as shown in FIG. 3C, the lift axle indicator 302 may be removed from the screen 128 after the time out period has elapsed.

As another example, and as shown in FIG. 3D, when a lift axle is lifted (e.g., via a selection of a switch or dial, automatically lifted due to a drive mode change or set parking brake, automatically lifted due to a loss of air pressure, etc.), the lift axle indicator 302 may be automatically re-displayed on the screen 128 in the notification zone 212 indicating the state change. Accordingly, the driver may be proactively informed of a relevant state change and may not be required to continually monitor axle air pressure statuses. For example, if the lift axle indicator comes into view on the display when the driver doesn't expect it or request a state change via the switch (e.g., a pressure loss may trigger a 'lift signal' which may cause the lift axle indicator to be displayed), the driver's attention may be captured for the relevant lift axle information. In some examples and as shown in FIG. 3D, when the lift axle is being lifted, an up arrow 312b may be shown to indicate the lift, and the air pressure measurement 310 may dynamically decrease. In some examples and as shown in FIG. 3E, when the air pressure reading reaches a value of 0, the air pressure measurement 310 may be removed from display (e.g., a 0 PSI value may not be shown). FIG. 3F shows an example of the lift axle indicator 302 being self-suppressed after a time out period after the air pressure measurement 310 reaches a steady state of 0 PSI.

As described above, the lift axle indicator 302 may comprise various configurations of lift axle sections 306 based on the configuration of the vehicle 102. Examples of other configurations of lift axle sections 306 are illustrated in FIGS. 3G-M. As should be appreciated, the state of each of the lift axle sections 306 may dynamically change based on the current state of the corresponding lift axles.

In FIG. 3G, a second example lift axle indicator 302b illustrates an example configuration including two lift axle sections 306a,b representing two pusher lift axles, wherein the first lift axle section 306a is in a lowered state, and the second lift axle section 306b is in an inactive/lifted state. For example, an 'inactive' state may correspond with a state of a lift axle when the associated manual control is not in an actuated position and when, if the associated lift axle has been lifted or lowered, the time out period has expired.

In FIG. 3H, a third example lift axle indicator 302c illustrates an example configuration including three lift axle sections 306a,b,c representing three pusher lift axles, wherein the first lift axle section 306a is in a lowered state, the second lift axle section 306b is also in a lowered state, and the third lift axle section 306c is in an inactive/lifted state.

In FIG. 3I, the third example lift axle indicator 302c illustrated in FIG. 3H is shown, wherein the first and second lift axle sections 306a,b are in an active/lifted state (e.g., recently lifted) and the third lift axle section 306c is in an inactive/lifted state.

In FIG. 3J, a fourth example lift axle indicator 302d illustrates an example configuration including four lift axle sections 306a,b,c,d representing four pusher lift axles, wherein all four lift axle sections 306a-d are in a lowered state.

In FIG. 3K, a fifth example lift axle indicator 302e illustrates an example configuration including one lift axle section 306e representing a tag lift axle, wherein the lift axle section 306e is in a lowered state.

In FIG. 3L, a sixth example lift axle indicator 302f illustrates an example configuration including three lift axle sections 306a,b,e representing two pusher lift axles and one tag lift axle, wherein the first pusher lift axle section 306a is in a lowered state, and the second pusher lift axle section 306b and the tag lift axle section 306e are in an inactive/lifted state.

In FIG. 3M, a seventh example lift axle indicator 302g illustrates an example configuration including four lift axle sections 306a,b,c,e representing three pusher lift axles and one tag lift axle, wherein the three pusher lift axle sections 306a,b,c and the tag lift axle section 306e are in a lowered state. As should be appreciated, other vehicle axle configurations and lift axle indicator configurations are possible and are within the scope of the present disclosure.

In some examples, a lift axle indicator 302 may be displayed in a warning state. For example, a lift axle may be lifted automatically due to loss of air pressure. Accordingly, the lift axle indicator 302 may be automatically displayed on the screen 128 in the notification zone 212 indicating the state change. In some examples, the lift axle may be automatically re-pressurized and re-lowered, wherein the lift axle indicator 302 may be displayed in a warning state to notify the driver of the current state and automated actions. An example lift axle indicator 302h displayed in a warning state is shown in FIG. 3N. For example, a message 314 may be included in the notification zone 212 indicating that the lift axle is being re-pressurized, and the lift axle indicator 302h may indicate that the lift axle is being re-lowered.

According to an aspect, a notification, such as the lift axle indicator 302 and the TPMS indicator (described further below), may be displayed in a particular color and with a particular degree or level of salience based on a warning/priority level or message severity classification determined based on safety relevance, operational relevance, and time. In some examples, a popup notification may be displayed in one of three colors: white, amber, or red, and may further be presented with animation effects (e.g., flashing), sound (e.g., audible alerts, dings, or other sound clips), or haptic feedback for increased salience. In some examples, certain criteria may be evaluated for determining a warning/salience level and sub-level, wherein a particular warning/salience level may correspond to a display color (e.g., white, amber, or red) and other presentation attributes (e.g., animation effects, sound, haptic feedback) corresponding to salience. In some examples, the color white may be used for a popup notification that may be information and that may not include a known hazard or operational risk. A white popup notification may not be presented with flashing or sound. In some examples, the color amber may be used for a popup notification that may include operational relevance-related information, such as to notify the driver of a system that he/she may need to monitor as vehicle operation is continued. In some examples, an amber popup notification may be presented according to various saliency sub-levels. In some examples, the color red may be used for a popup notification that may include very high safety relevance or operational relevance, such as to notify the driver that the vehicle 102 needs to be pulled over immediately. In some examples, a red popup notification may be presented according to various saliency sub-levels.

The example lift axle indicator 302h illustrated in FIG. 3N is shown as an amber popup notification. In some examples and as shown in FIG. 3N, an amber-colored background glow 316 may be displayed in the background area behind or around an amber-level popup notification, such as the lift axle indicator 302h when in a warning state.

Figure 4:
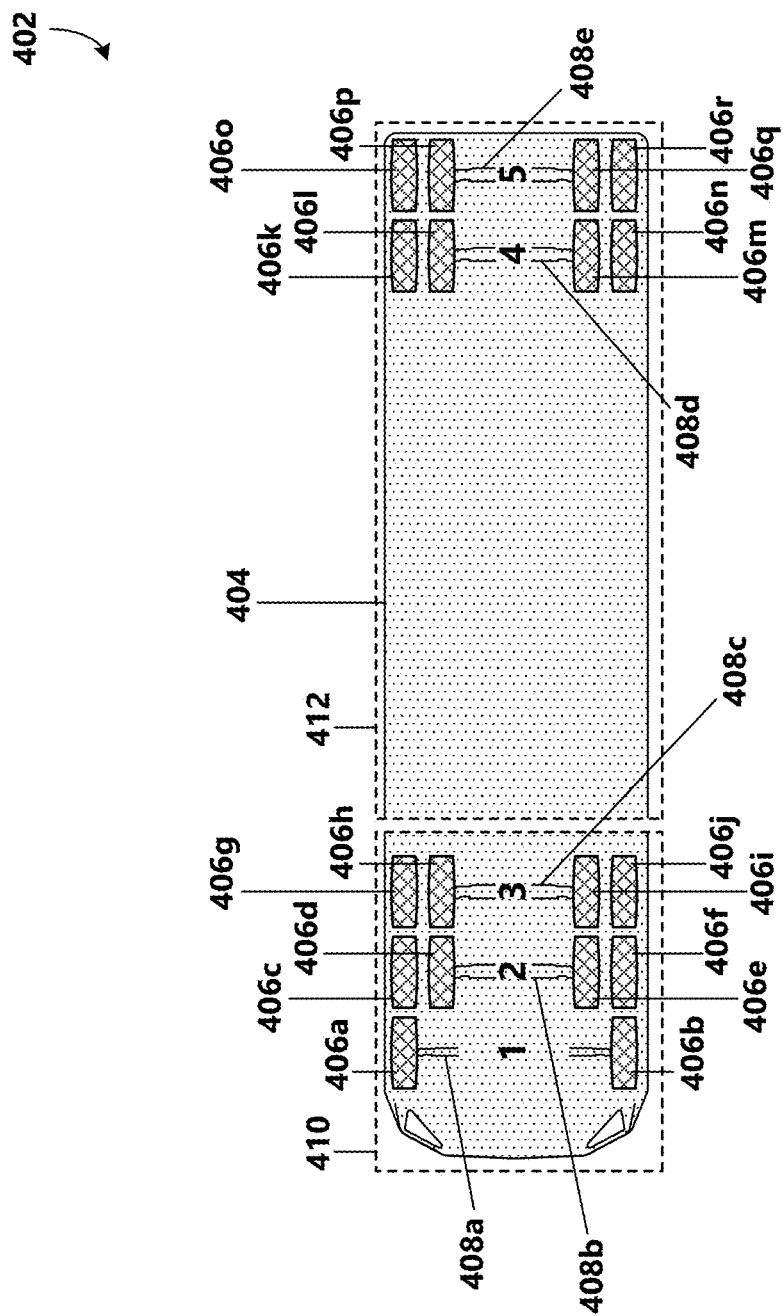
FIG. 4 is an illustration of an example TPMS indicator including a top-down view representation of the vehicle.

According to another example aspect of the present disclosure, and with reference to FIG. 4, a TPMS indicator 402 including a graphical representation of data associated with statuses of each tire of the vehicle 102 may be provided for display in the digital instrument cluster 106. For example, each tire on the vehicle 102 may include one or more physical sensors that may be configured to collect and provide pressure and temperature measurements. According to an aspect and as illustrated in FIG. 4, the graphical representation of data may include a top-down view representation 404 of the vehicle 102, including representations of the vehicle's associated tire 406a-n and axle 408a-n configurations. The top-down view vehicle representation 404 may provide context to the driver for helping the driver to quickly and easily identify a tire 406 that may have an issue. For example and as described below, the TPMS indicator 402 may be used to notify the driver of a tire pressure or temperature issue.

Various types of axles may be represented by the displayed axles 408, including any steering or dead axles, lift axles, drive axles, single-tire axles, double-tire axles, axles with TPMS signals and axles with no TPMS signals, etc. Axles with no TPMS signals may be visually distinct from axles with TPMS signals. In some examples, real-time tire-pressure data provided by TPMS sensors (e.g., vehicle information source 118) and other axle sensor data may be used by the instrument cluster UI engine 104 to generate the appropriate displayed tire 406 and axle 408 configurations that correspond to the vehicle's actual tire and axle configuration. For example, the example vehicle representation 404 shown in FIG. 4 includes a total of five displayed axles 408a-e, wherein the first axle 408a includes two tires 406a,b, and the other four axles 408b-e each include four tires 406c-r. In some examples, the displayed tire 406 and axle 408 configurations may be manually adjusted by the driver to match the vehicle's actual tire and axle configuration. For example, in a menu screen that may be accessed by the driver, the driver may be enabled to select a particular displayed axle 408 and move the axle to a position that may more closely resemble the vehicle's actual tire and axle configuration.

In other examples, additional data may be used to generate the appropriate displayed tire 406 and axle 408 configurations that relate to the vehicle's actual tire and axle configuration. For example, tire and axle configuration data associated with the truck/tractor portion of the vehicle 102 may be stored in memory and utilized to generate the displayed tire 406 and axle 408 configurations associated with the truck/tractor portion 410 of the vehicle representation 404. For example, in the example vehicle representation 404 shown in FIG. 4, the truck/tractor portion 410 of the vehicle representation 404 includes three axles 408a-c with two tires 406a,b on the first axle 408a, four tires 406c-f on the second axle 408b, and four tires 406g-j on the third axle 408c.

As another example, identification information associated with the trailer portion of the vehicle 102 may be used to determine a tire and axle configuration of the trailer portion of the vehicle 102, which may be used to generate the displayed tire 406 and axle 408 configurations associated with the trailer portion 412 of the vehicle representation 404. Or, in other examples, tire and axle configuration data associated with the trailer portion of the vehicle 102 may be provided by an information source (e.g., radio frequency identification (RFID) tag or other wireless or wired information source) associated with the trailer and received and utilized by the instrument cluster UI engine 104 to generate the displayed tire 406 and axle 408 configurations associated with the trailer portion 412 of the vehicle representation 404. In the example vehicle representation 404 shown in FIG. 4, the trailer portion 412 of the vehicle representation 404 includes two additional axles 408d,e with four tires 406k-n on the fourth axle 408d and four tires 406o-r on the fifth axle 408e.

Figure 5A:
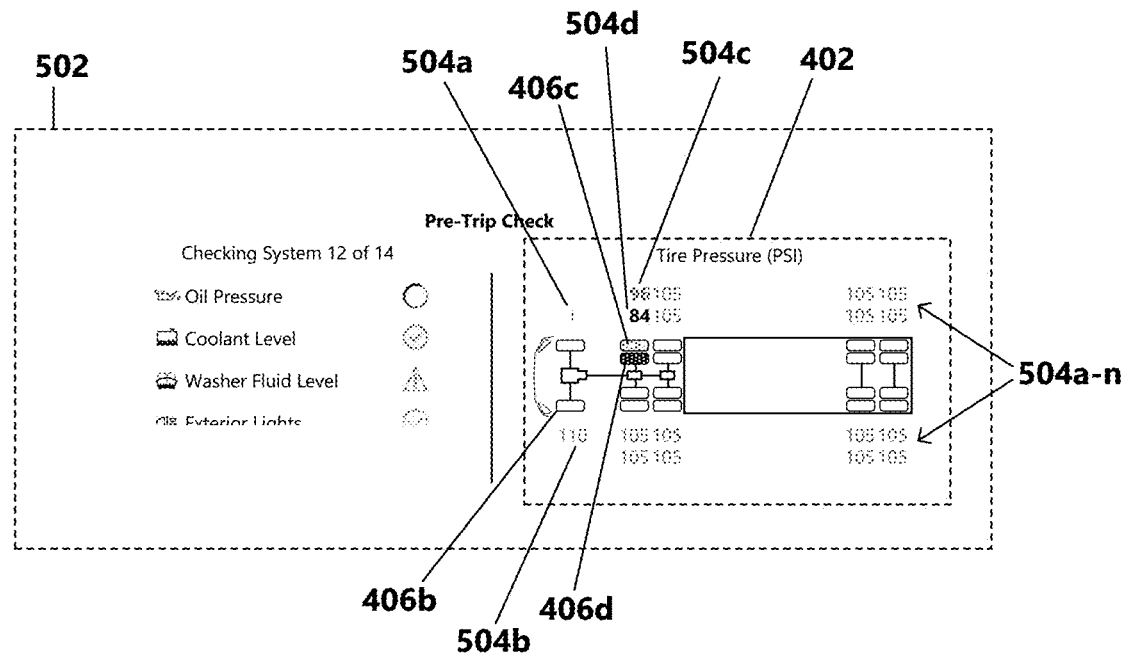
FIG. 5A is an illustration of a pre-trip check screen including a TPMS indicator showing a tire pressure issue.

According to an aspect, the TPMS indicator 402 may be displayed in various formats and display screens. In some examples and as illustrated in FIG. 5A, the TPMS indicator 402 may be included in a pre-trip check screen 502 that may be displayed as part of a pre-trip check function that may be utilized by the driver to check various vehicle systems, including tire statuses. In an example embodiment, the pre-trip check screen 502 and a post-trip check screen 506 (described below) may be part of a driver task assistance and performance coach system, such as is described in U.S. Provisional Patent Application No. 62/970,456, titled "Driver Task Assistance and Performance Coaching System." In some examples, an air pressure measurement 504 for each tire 406 may be included in the TPMS indicator 402. In some examples, a temperature measurement for each tire 406 may be included in the TPMS indicator 402. In some examples, a temperature measurement may be displayed when a temperature event (associated with an out-of-parameter or warning temperature measurement) occurs. A tire 406 may be in one of three states: within-normal operating range state (i.e., normal state), an out-of-parameter range state (i.e., out-of-parameter state), or a warning range state (i.e., warning or critical state).

Air pressure measurements 504 that are within a normal operating range (e.g., within a threshold of a setting value) may be displayed in relation to the associated tires 406 in the normal state as informational. For example and as illustrated in FIG. 5A, a tire 406b with a within-normal threshold air pressure measurement 504b may be displayed with a low level of salience (e.g., displayed in white).

In some examples, when an air pressure measurement 504 or temperature measurement is outside of the normal operating threshold but not within the warning range, the out-of-parameter air pressure measurement 504 or temperature measurement may be displayed in relation to the associated tire 406 in the out-of-parameter state. For example and as illustrated in FIG. 5A, a tire 406c with an out-of-parameter air pressure measurement 504c may be displayed with an increased level of salience (e.g., displayed in an amber color), such as to notify the driver to monitor the out-of-parameter tire 406c.

Figure 5B:
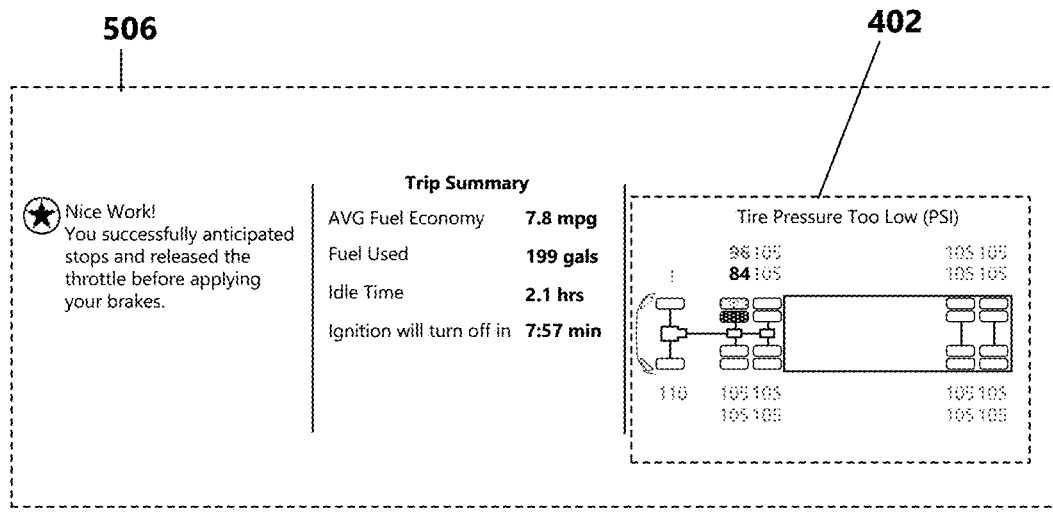
FIG. 5B is an illustration of a post-trip check screen including a TPMS indicator showing a tire pressure issue.
Figure 5C:
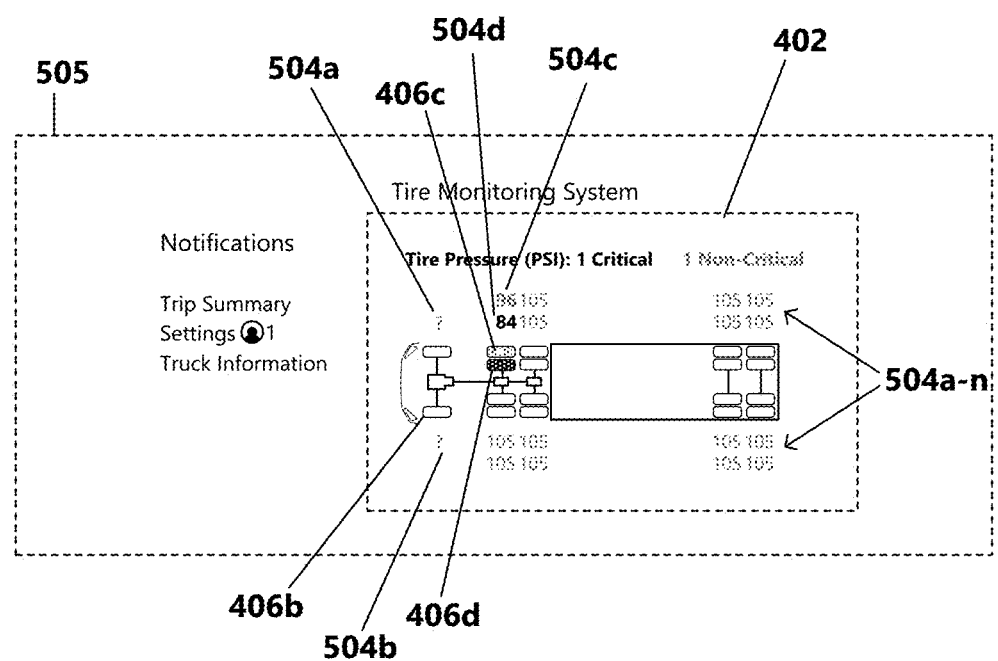
FIG. 5C is an illustration of a notifications submenu screen including a TPMS indicator showing a tire pressure issue.

In some examples, when an air pressure measurement 504 or temperature measurement is outside the out-of-parameter range and within a warning range, the air pressure measurement 504 or temperature measurement may be displayed in relation to the associated tire 406 in the warning state. For example and as illustrated in FIG. 5A, a tire 406d with a warning level air pressure measurement 504d may be displayed with a further increased level of salience (e.g., displayed in a red color), such as to notify the driver of a critical issue. As another example and as illustrated in FIG. 5B, the TPMS indicator 402 may be included in a post-trip check screen 506 that may be displayed as part of a post-trip check function that may be utilized by the driver to check a trip summary of various vehicle systems, including tire statuses. As another example, the TPMS indicator 402 may be accessed and displayed via a menu function. For example and as illustrated in FIG. 5C, within the menu system, a notifications submenu and an associated notifications submenu screen 505 may be provided. The notifications submenu screen 505 may be a scrollable repository of all active warnings and notifications via which a user can use to manually review all warning and pop-up level content when the vehicle 102 is parked. The notifications submenu screen 505 may include the TPMS indicator 402 and warnings (if installed), active warnings and notifications listed in order of priority from highest to lowest, and a systems check, which may include an overview of systems of the vehicle 102 with simplified positive or negative indications to give statuses of the systems as a whole. In some examples, the TPMS indicator 402 includes a value (e.g., pressure value, or, if there is a tire temperature warning, a temperature value) for each tire 406, wherein the color of the value may reflect the status of the tire (e.g., within parameter, out-of-parameter, or warning). According to an aspect, the TPMS indicator 402 in the notifications submenu screen 505 allows the user to understand which tires need attention and allows technicians to easily locate and diagnose issues with the tires.

In some examples, if a tire pressure event (associated with an out-of-parameter or warning air pressure measurement) and a tire temperature event (associated with an out-of-parameter or warning temperature measurement) occur concurrently, the air pressure measurements 504 and the temperature measurements may be displayed in an alternating manner (e.g., every 5 seconds). As should be appreciated the unit of measure (e.g., metric vs US standard) used for the temperature measurements may correspond with the unit of measure used for the air pressure measurements 504).

Figure 5D:
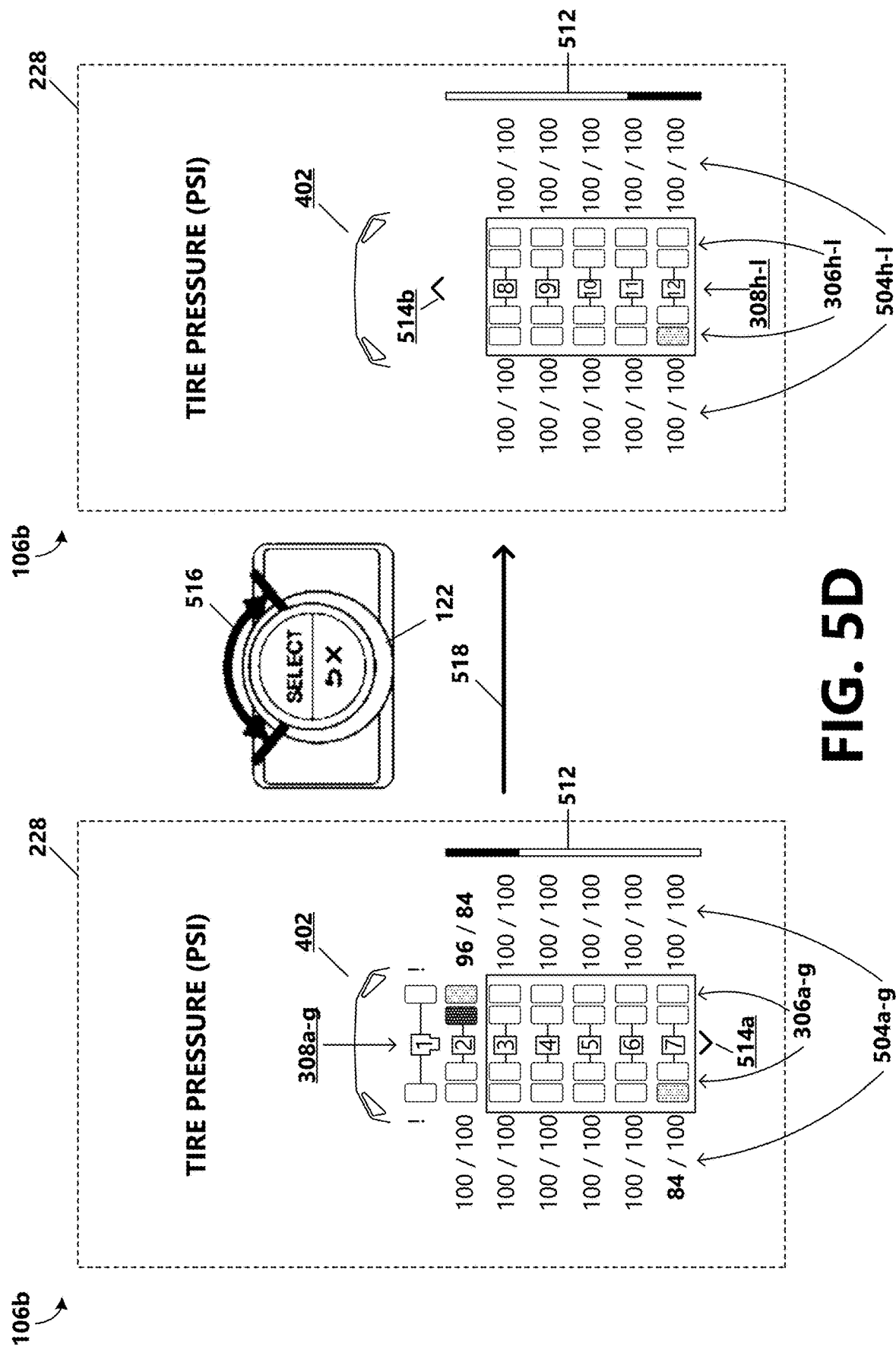
FIG. 5D is an illustration of a scrollable TPMS indicator shown on a display card included in an instrument cluster indicating a tire pressure issue.

FIG. 5D includes an illustration of a TPMS indicator 402 shown in a card 228 displayed in an example instrument cluster 106b. In some examples, the card 228 may be displayed responsive to a selection to view a TPMS card 228. As should be appreciated, additional vehicle status-related information may be included in the card 228. In some examples, a scroll bar 512 may be displayed when the TPMS indicator 402 includes additional axles 308 that may be out of the visible plane. For example, the driver may be enabled to manually dial 516 the cluster control 122 to scroll 518 the display of the TPMS indicator 402 within a scroll region. In some examples, a chevron 514 may also be displayed when the TPMS indicator 402 includes additional axles 308 that may be out of the visible plane. For example, a down chevron 514a may be displayed at the bottom of the TPMS indicator 402 to indicate that additional axles 308h-l are scrollable below. As the user dials 516 the cluster control 122 and scrolls 518 the display to reveal the higher axles 308*h-l* (as shown on the right-hand side of FIG. 5D), the down chevron 514*a* may disappear and reappear as an up chevron 514*b* at the top of the TPMS indicator 402 indicating additional axles 308*a-g* available outside the visible plane. In some examples, if a tire's air pressure measurement is outside of the normal operating threshold, the chevron 514 may be displayed with an increased level of salience (e.g., displayed in an amber color or red color matching the out-of-parameter or warning state).

Figure 5E:
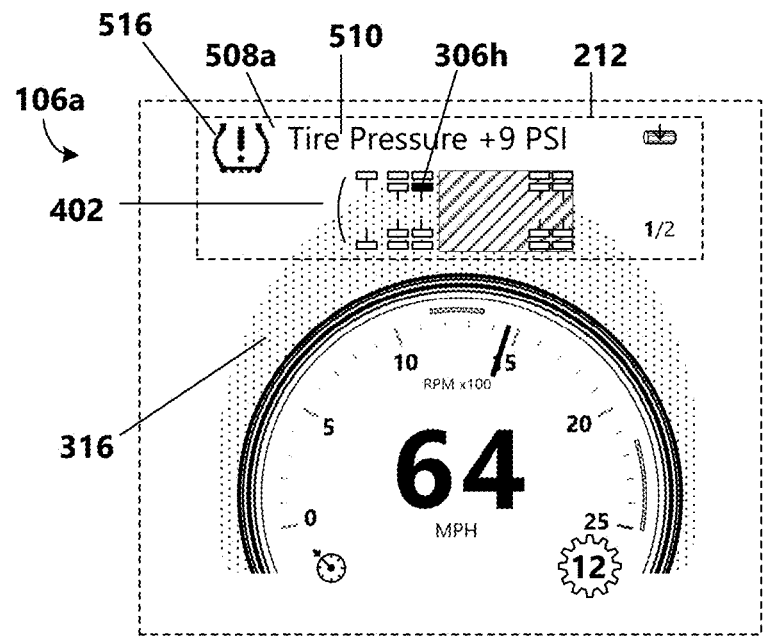
FIG. 5E is an illustration of an instrument cluster showing a popup notification including an indication of an out-of-parameter tire pressure measurement.

As another example and as illustrated in FIGS. 5E,F, the TPMS indicator 402 may be included in a popup notification 508. For example, when an air pressure measurement 504 or temperature measurement is outside of the normal operating threshold, a popup notification 508 may be displayed in the notification zone 212 to alert the driver. In some examples, the popup notification 508 may include a title/short message 510 which may indicate whether the tire pressure or temperature is too low or too high, and may further include the out-of-parameter or warning level air pressure measurement 504 or temperature measurement or the discrepancy (e.g., − or +) between the out-of-parameter or warning value and the setting value. In some examples, if multiple tire issues are detected, a popup notification 508 for each tire issue may be generated. The example popup notification 508*a* shown in FIG. 5E shows a tire 306*h* in an out-of-parameter state, wherein the air pressure measurement is determined to be outside of the normal operating threshold. When in the out-of-parameter state, a background glow 316 may be displayed indicating an increased level of salience (e.g., displayed in an amber color corresponding to the out-of-parameter state). Additionally, the title/short message 510 may also be displayed with an increased level of salience, such as in an amber color corresponding to the out-of-parameter state.

Figure 5F:
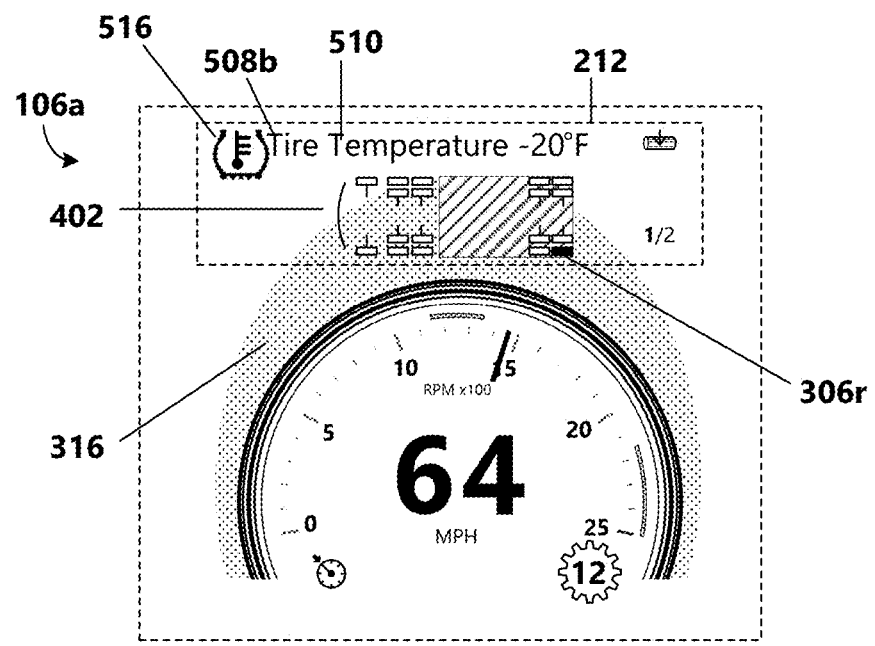
FIG. 5F is an illustration of an instrument cluster showing a popup notification including an indication of a warning-level tire pressure measurement.

The example popup notification 508*b* shown in FIG. 5F shows a tire 306*r* in a warning state, wherein the temperature measurement is determined to be in a warning range. When in the warning state, a background glow 316 may be displayed indicating an increased level of salience (e.g., displayed in a red color corresponding to the warning state). Additionally, the title/short message 510 may also be displayed with a further increased level of salience, such as in a red color corresponding to the warning state.

Figure 6:
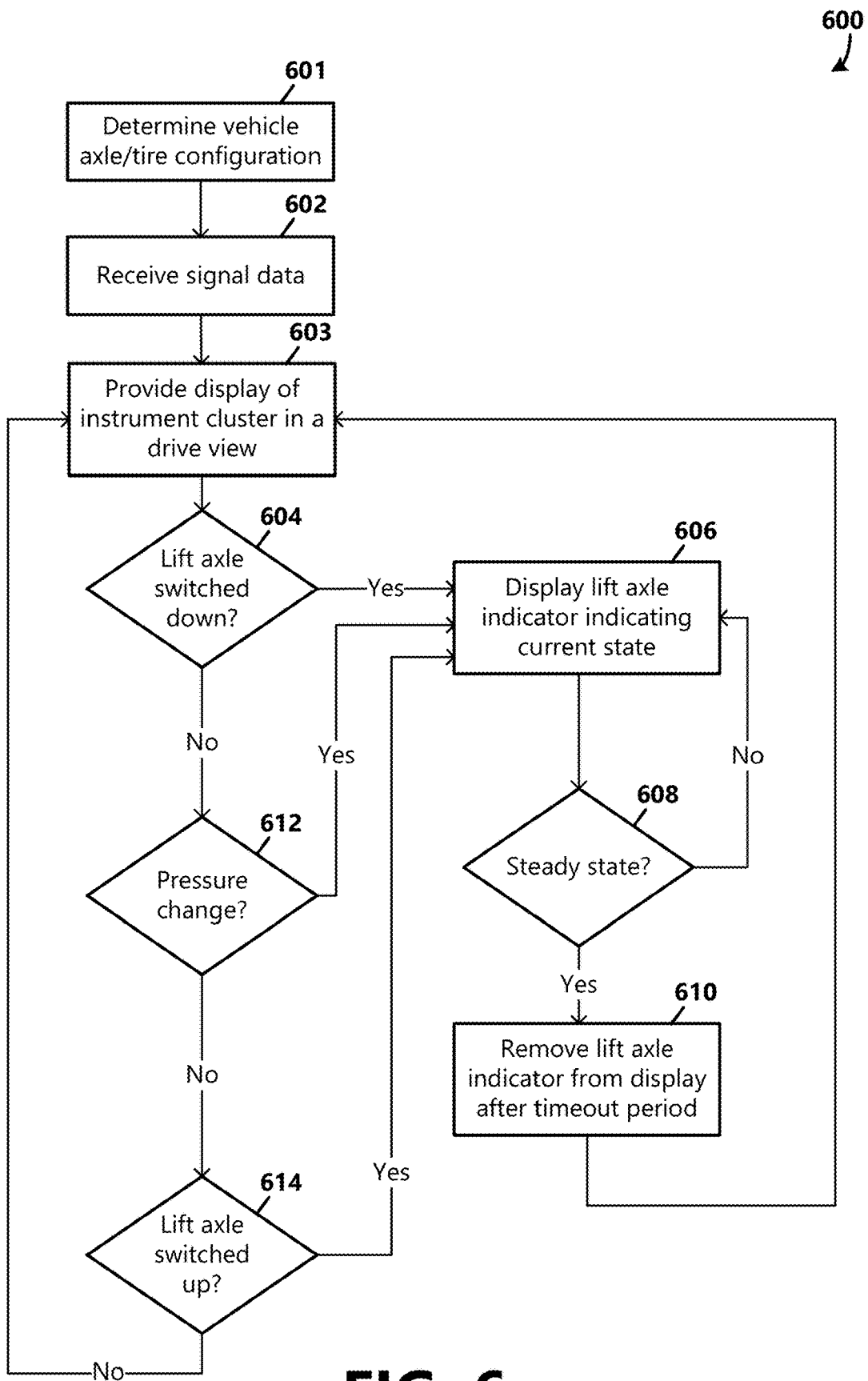
FIG. 6 is a flow diagram depicting general stages of an example process for providing an indication of a lift axle state change.

FIG. 6 is a flow diagram depicting general stages of an example method 600 for providing a dynamic indication of chassis status. At OPERATION 601, vehicle axle and tire configuration information may be determined. In some examples, vehicle axle and tire configuration may be determined based on stored vehicle build configuration data, identification of a trailer type and stored configuration information associated with the trailer type, trailer configuration information received via an information source on the trailer portion of the vehicle 102, received signal information (e.g., a wireless message from a remote information source), etc. In some examples, vehicle axle and tire configuration information may be modified by the driver. For example, the driver may be enabled to modify the layout of the vehicle axle and tire configuration via an instrument cluster menu, such as to rearrange axle sections to more accurately represent the layout of the vehicle 102. The vehicle axle and tire configuration information may be stored in memory on the vehicle 102.

At OPERATION 602, signal data from various vehicle sensors, including axle pressure sensors, may be (continually) received, and at OPERATION 603, an instrument cluster 106 may be displayed while a vehicle 102 is in a drive mode. At DECISION OPERATION 604, a determination may be made as to whether a lift axle has been switched down. For example, if a pusher switch/dial associated with a lift axle is actuated by the driver to lower the lift axle into an active state, an indication of the actuation may be received by the instrument cluster UI engine 104, and the method 600 may proceed to OPERATION 606, where a lift axle indicator 302 may be automatically displayed as a popup notification in the notification zone 212. According to an aspect, the lift axle indicator 302 may show the lift axle section 306 corresponding to the actuated lift axle in a lowering state. For example, the position of the lift axle section 306 may be displayed as lowered in relation to the vehicle representation 304, and a down arrow 312*a* may also be shown in relation to a lift axle section 306 pointing in a downward direction. In some examples, an air pressure measurement 310 may additionally be shown in relation to a lift axle section 306, wherein the air pressure measurement 310 may be dynamically updated to represent the current measured air pressure. For example, the air pressure measurement 310 may dynamically increase as the lift axle is being lowered. In other examples, the air pressure measurement 310 may display a pre-calibrated default/set air pressure setting for the lift axle. In other examples, the air pressure measurement 310 may not be displayed.

At DECISION OPERATION 608, a determination may be made as to whether a steady air pressure state has been reached. For example, if a determination is made that the measured air pressure is increasing, the method 600 may loop back to OPERATION 606, where the lift axle indicator 302 may continue to be displayed in the lowering state. As another example, if a determination is made that the measured air pressure has reached the default/set air pressure setting or has reached a steady state, at OPERATION 610, the lift axle indicator 302 may continue to be displayed during a timeout period, wherein the default/set air pressure setting may be indicated by a display of the air pressure measurement 310. After the timeout period, the lift axle indicator 302 may be removed from the instrument cluster display 106, and the method 600 may return to OPERATION 602.

If, at DECISION OPERATION 604, an indication of a signal to lower the lift axle is not received, at DECISION OPERATION 612, a determination may be made as to whether a change outside of a threshold range in air pressure is detected. According to an aspect, the threshold range may allow for fluctuations that may occur during normal driving conditions. In some examples, a loss of air pressure may indicate a leak, which may cause the lift axle to lift. In other examples, an increase of air pressure may indicate that a lift axle is being automatically re-pressurized to lower the axle after a detected leak.

When a change outside of the threshold air pressure range is detected, the method 600 may proceed to OPERATION 606, where the lift axle indicator 302 may be automatically displayed as a popup notification in the notification zone 212. According to an aspect, the lift axle indicator 302 may indicate the lift axle section 306 corresponding to the lift axle experiencing the air pressure change. The position of the lift axle section 306 may be displayed as lifted or lowered in relation to the vehicle representation 304, and a down arrow 312*a* or an up arrow 312*b* may also be shown in relation to a lift axle section 306 pointing in a downward or an upward direction. In some examples, an air pressure measurement 310 may additionally be shown in relation to a lift axle section 306, wherein the air pressure measurement 310 may be dynamically updated to represent the current measured air pressure. For example, the air pressure measurement 310 may dynamically decrease as the air pressure decreases and as the lift axle is being lifted.

At DECISION OPERATION 608, a decision may be made as to whether a steady state has been reached. For example, if the air pressure continues to decrease, the method 600 may return to OPERATION 606, where the lift axle indicator 302 may continue to be displayed indicating the pressure change. If a steady state is reached, the method 600 may proceed to OPERATION 610, where the lift axle indicator 302 may continue to be displayed during a timeout period. After the timeout period, the lift axle indicator 302 may be removed from the instrument cluster display 106, and the method 600 may return to OPERATION 602.

If, at DECISION OPERATION 612, a pressure change is not detected, at DECISION OPERATION 614, a determination may be made as to whether a lift axle has been switched up. For example, if a pusher switch/dial associated with a lift axle is actuated by the driver to lift the lift axle, an indication of the actuation may be received by the instrument cluster UI engine 104, and the method 600 may proceed to OPERATION 606, where a lift axle indicator 302 may be automatically displayed as a popup notification in the notification zone 212. According to an aspect, the lift axle indicator 302 may show the lift axle section 306 corresponding to the actuated lift axle in a lifting state. For example, the position of the lift axle section 306 may be displayed as lifted in relation to the vehicle representation 304 included in the lift axle indicator 302, and an up arrow 312b may also be shown in relation to the lift axle section 306 pointing in an upward direction. In some examples, an air pressure measurement 310 may additionally be shown in relation to the lift axle section 306, wherein the air pressure measurement 310 may be dynamically updated to represent the current measured air pressure. For example, the air pressure measurement 310 may dynamically decrease as the lift axle is being lifted. In other examples, the air pressure measurement 310 may not be displayed.

At DECISION OPERATION 608, a determination may be made as to whether a steady state has been reached. For example, if the air pressure continues to decrease, the method 600 may return to OPERATION 606, where the lift axle indicator 302 may continue to be displayed indicating the transitionary state. If a steady state is reached, the method 600 may proceed to OPERATION 610, where the lift axle indicator 302 may continue to be displayed during a timeout period. After the timeout period, the lift axle indicator 302 may be removed from the instrument cluster display 106, and the method 600 may return to OPERATION 602.

Figure 7:
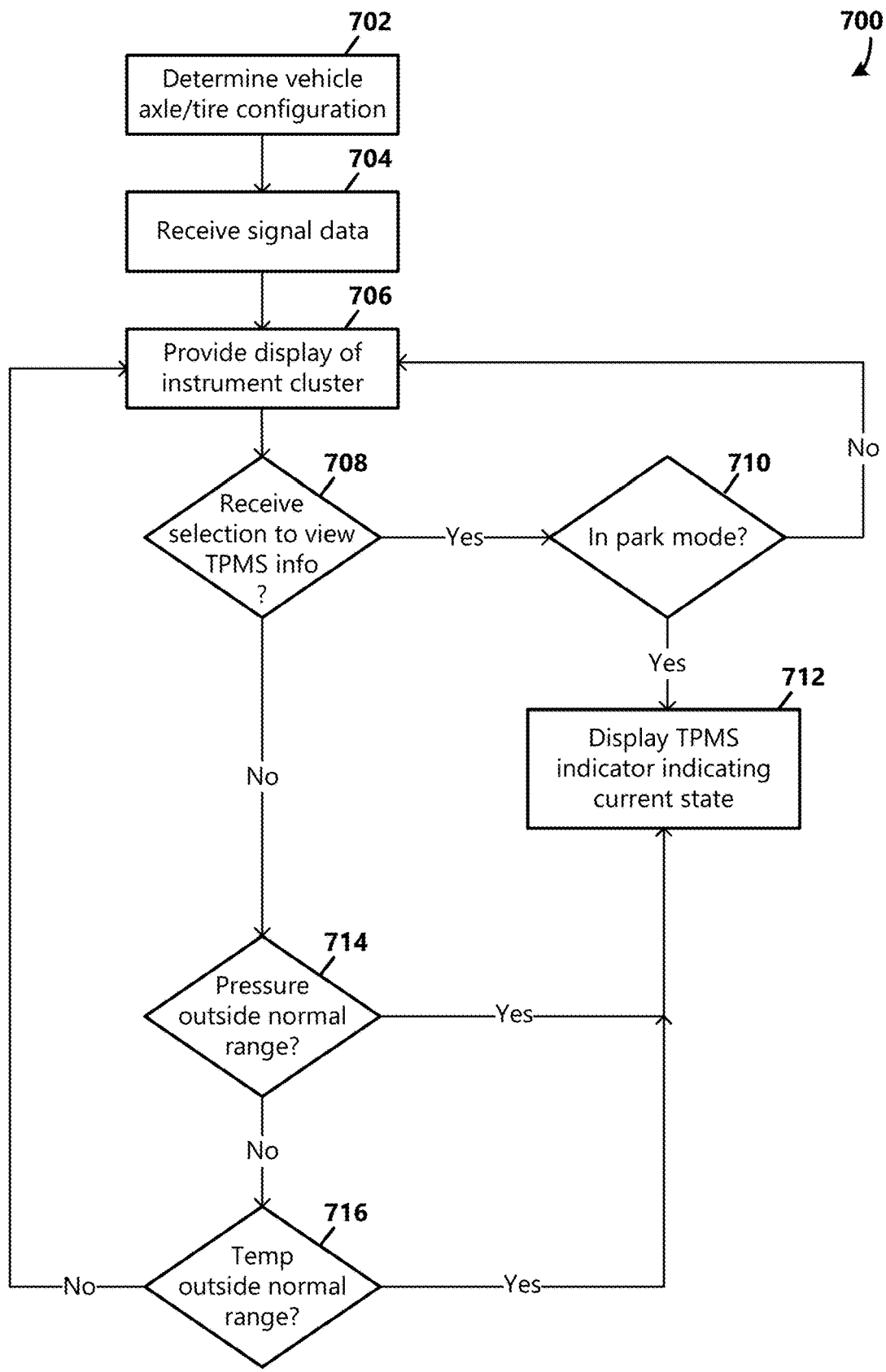
FIG. 7 is a flow diagram depicting general stages of an example process for providing an indication of a tire pressure or temperature issue.

FIG. 7 is a flow diagram depicting general stages of an example method 700 for providing a dynamic indication of tire status. At OPERATION 702, vehicle axle and tire configuration information may be determined. In some examples, vehicle axle and tire configuration may be determined based on stored vehicle build configuration data, identification of a trailer type and stored configuration information associated with the trailer type, trailer configuration information received via an information source on the trailer portion of the vehicle 102, received TPMS signal information, a wireless message from a remote information source, etc. In some examples, vehicle axle and tire configuration information may be modified by the driver. For example, the driver may be enabled to modify the layout of the vehicle axle and tire configuration via an instrument cluster menu, such as to rearrange axle sections to more accurately represent the layout of the vehicle 102. The vehicle axle and tire configuration information may be stored in memory on the vehicle 102.

At OPERATION 704, signal data from various vehicle sensors, including TPMS sensors, may be (continually) received, and at OPERATION 706, the instrument cluster 106 may be displayed on the in-vehicle display screen 128. At DECISION OPERATION 708, a determination may be made as to whether a selection to view TPMS information is received. For example, the driver may be enabled to select to perform a pre-trip inspection, where conditions of various vehicle systems, including the TPMS system, may be checked and shown to the driver in a pre-trip check screen 502. As another example, the driver may be enabled to select to perform a post-trip inspection, where statuses of various vehicle systems, including the TPMS system, may be checked and shown to the driver along with a summary of notifications activated during a trip in a post-trip check screen 506. As another example, the driver may be enabled to select to view TPMS status information via a menu selection (e.g., in a notifications submenu 505).

When a determination is made that a selection to view TPMS information is received at DECISION OPERATION 708, the method 700 may proceed to DECISION OPERATION 710, where pre-defined conditions may be checked to determine whether the TPMS status information can be displayed to the driver at the time of selection. One example, pre-defined condition may include that that the vehicle 102 is in a park mode. In some examples, another pre-defined condition may include that a parking brake is set. If pre-defined conditions are not satisfied, a notification of a non-satisfied pre-defined condition may be displayed, and the method 700 may return to OPERATION 706. If pre-defined conditions are satisfied, the method 700 may proceed to OPERATION 712, where the TPMS indicator 402 showing a top-down view representation of the vehicle 102 designating the tractor and trailer portions of the vehicle and the relevant statuses of the tires based on TPMS signal data may be displayed in the instrument cluster 106. For example, air pressure and temperature measurements of a tire that are within a normal operating range may indicated by a display of the associated tire 406 in a normal/informational state, measurements within an out-of-parameter range may indicated by a display of the measurement(s) 504 and associated out-of-parameter tire 406 with an increased level of salience (e.g., displayed in an amber color), and measurement(s) above/below a warning threshold may be indicated by a display of the measurement(s) 504 and associated tire 406 with a further increased level of salience (e.g., displayed in a red color).

If a selection to view TPMS information is not received at DECISION OPERATION 708, the method 700 may proceed to DECISION OPERATION 714, where a determination may be made as to whether a tire air pressure measurement is outside the tire's normal operating range (e.g., outside a threshold range of a set tire pressure setting). When a tire is outside its normal operating range, the method 700 may proceed to OPERATION 712, where a popup notification 508 may be displayed to alert the driver. If multiple tire issues are detected, a popup notification 508 for each tire issue may be generated and displayed in turn. According to an aspect, the popup notification 508 may be displayed indicating the tire with the issue according to a level a saliency based on whether the measurement is within an out-of-parameter range or in a warning range. For example, when the tire is in the out-of-parameter state, the tire, an associated measurement, an associated message 510, and a background glow 316 may be displayed with an increased level of salience (e.g., displayed in an amber color corresponding to an out-of-parameter state or in a red color corresponding to a warning state).

When a tire is not outside its normal operating range at DECISION OPERATION 714, the method 700 may proceed to DECISION OPERATION 716, where a determination may be made as to whether a tire temperature measurement is outside the tire's normal operating range (e.g., outside a threshold range of a set tire pressure setting). When a tire is outside its normal operating range, the method 700 may proceed to OPERATION 712, where a popup notification 508 may be displayed to alert the driver. If multiple tire issues are detected, a popup notification 508 for each tire issue may be generated and displayed in turn. According to an aspect, the popup notification 508 may be displayed indicating the tire with the issue according to a level a saliency based on whether the measurement is within an out-of-parameter range or in a warning range. For example, when the tire is in the out-of-parameter state, the tire, an associated measurement, an associated message 510, and a background glow 316 may be displayed with an increased level of salience (e.g., displayed in an amber color corresponding to an out-of-parameter state or in a red color corresponding to a warning state). When a tire is not outside its normal operating range at DECISION OPERATION 716, the method 700 may return to OPERATION 706.

Figure 8:
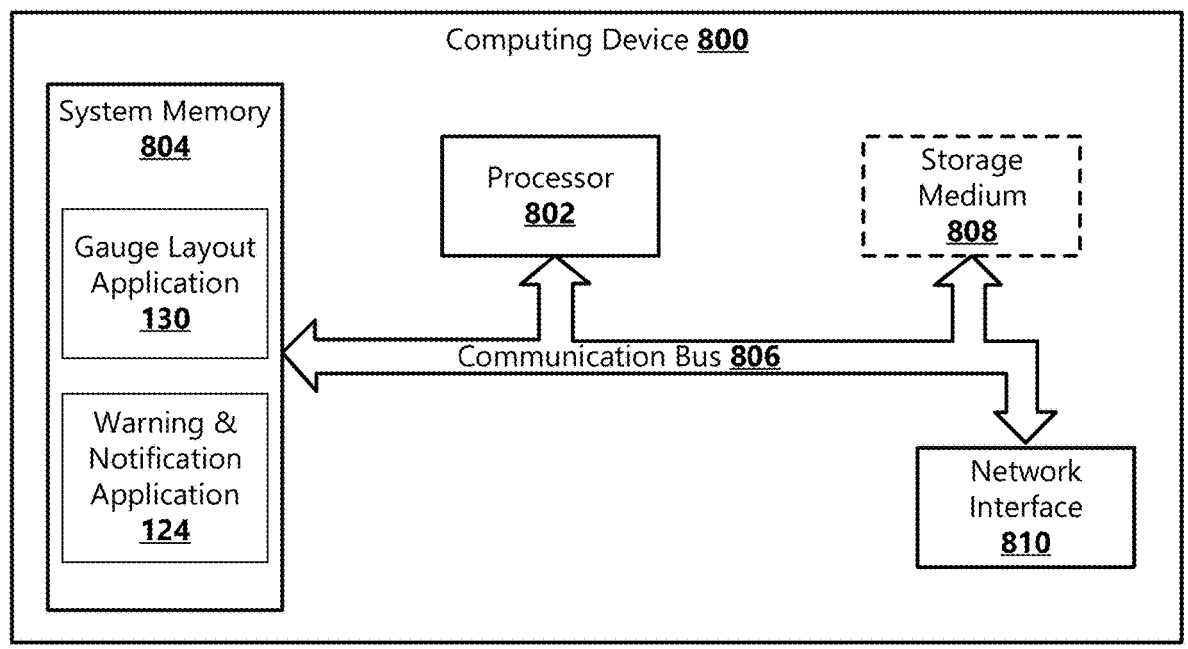
FIG. 8 is a block diagram of an example physical components of a computing device or system with which embodiments may be practiced.

FIG. 8 is a block diagram of an illustrative computing device 800 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 800 includes at least one processor 802 and a system memory 804 connected by a communication bus 806. Depending on the exact configuration and type of device, the system memory 804 may be volatile or nonvolatile memory, such as read-only memory ("ROM"), random access memory ("RAM"), EEPROM, flash memory, or other memory technology. Those of ordinary skill in the art and others will recognize that system memory 804 typically stores data or program modules that are immediately accessible to or currently being operated on by the processor 802. In some examples, system memory 804 may store an application to perform elements of the present systems and methods, such as the gauge layout application 130 and/or the warning and notification application 124. In this regard, the processor 802 may serve as a computational center of the computing device 800 by supporting the execution of instructions.

As further illustrated in FIG. 8, the computing device 800 may include a network interface 810 comprising one or more components for communicating with other devices over a network. Embodiments of the present disclosure may access basic services that utilize the network interface 810 to perform communications using common network protocols. The network interface 810 may also include a wireless network interface configured to communicate via one or more wireless communication protocols, such as WiFi, 2G, 3G, 4G, LTE, WiMAX, Bluetooth, or the like.

In the illustrative embodiment depicted in FIG. 8, the computing device 800 also includes a storage medium 808. However, services may be accessed using a computing device that does not include means for persisting data to a local storage medium. Therefore, the storage medium 808 depicted in FIG. 8 is optional. In any event, the storage medium 808 may be volatile or nonvolatile, removable or non-removable, implemented using any technology capable of storing information such as, but not limited to, a hard drive, solid state drive, CD-ROM, DVD, or other disk storage, magnetic tape, magnetic disk storage, or the like.

As used herein, the term "computer-readable medium" includes volatile and nonvolatile and removable and non-removable media implemented in any method or technology capable of storing information, such as computer-readable instructions, data structures, program modules, or other data. In this regard, the system memory 804 and storage medium 808 depicted in FIG. 8 are examples of computer-readable media.

For ease of illustration and because it is not important for an understanding of the claimed subject matter, FIG. 8 does not show some of the typical components of many computing devices. In this regard, the computing device 800 may include input devices, such as a keyboard, keypad, mouse, trackball, microphone, video camera, touchpad, touchscreen, electronic pen, stylus, or the like. Such input devices may be coupled to the computing device 800 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 800 (e.g., a client device), or can be integral components of the computing device 800. In some embodiments, multiple input devices may be combined into a single, multifunction input device (e.g., a video camera with an integrated microphone). The computing device 800 may also include output devices such as a display, speakers, printer, etc. The output devices may include video output devices such as a display or touchscreen. The output devices also may include audio output devices such as external speakers or earphones. The output devices can be separate from and communicatively coupled to the computing device 800, or can be integral components of the computing device 800. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA', PHP, Perl, HTML, CSS, JavaScript, VBScript, ASPX, Microsoft .NET™ languages such as C#, or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

We claim:

1. A method for providing vehicle status indications to the interior of a cabin of a vehicle, comprising:
    receiving axle and tire configuration information associated with a trailer portion being towed by the vehicle, the axle and tire configuration information including information regarding a lift axle and its corresponding position on the trailer portion;
    receiving, from an information source on the trailer portion, an indication of a change in a state of the lift axle; and
    in response to the indication of the change in state of the lift axle, displaying a lift axle indicator including a side-view representation of the vehicle and one or more axle sections including the lift axle, wherein the side-view representation of the vehicle includes a representation of the status of the lift axle and the lift axle corresponding position in relation to the side view representation of the vehicle based on the axle and tire configuration information.

2. The method of claim 1, further comprising:
    determining an air pressure measurement of the lift axle has reached a steady state; and
    removing the lift axle indicator after a timeout period.

3. The method of claim 1, wherein receiving the indication of the change in state of the lift axle comprises receiving an indication of an actuation of a switch associated with the lift axle.

4. The method of claim 3, wherein when the switch is actuated to lower the lift axle, displaying the lift axle indicator comprises:
    displaying the associated lift axle section in a lowered position;
    displaying an arrow pointing in a downward direction; and
    displaying an air pressure measurement.

5. The method of claim 4, wherein displaying the air pressure measurement comprises:
    displaying a current air pressure measurement, wherein the current air pressure measurement dynamically increases as the lift axle is lowered; or
    displaying a pre-calibrated default air pressure value.

6. The method of claim 3, wherein when the switch is actuated to lift the lift axle, displaying the lift axle indicator comprises:
    displaying the associated lift axle section in a lifted position; and
    displaying an arrow pointing in an upward direction.

7. The method of claim 6, further comprising displaying a current air pressure measurement, wherein the current air pressure measurement dynamically decreases as the lift axle is lifted.

8. The method of claim 1, wherein receiving the indication of the change in state of the lift axle comprises receiving an indication of a loss of air pressure outside a threshold range.

9. The method of claim 8, further comprising:
    receiving an indication of a subsequent increase of air pressure associated with an automated re-pressuring of the lift axle; and
    displaying the lift axle indicator in a warning state.

10. A system for providing vehicle status indications to an interior of a cabin of a vehicle, the system comprising:
    at least one processor;
    a memory storage device including instructions that when executed, by the at least one processor, are configured to:
        receive axle and tire configuration information associated with a trailer portion being towed by the vehicle, the axle and tire configuration information including information regarding a lift axle and its corresponding position on the trailer portion;
        receive, from an information source on the trailer portion, an indication of a change in state of the lift axle;
    in response to the indication of the change in state of the lift axle, display a lift axle indicator including a side-view representation of the vehicle and one or more axle sections, wherein the side-view representation of the vehicle includes a representation of the status of the lift axle and the lift axle corresponding position in relation to the side-view representation of the vehicle based on the axle and tire configuration information;
determining an air pressure measurement of the lift axle has reached a steady state; and
removing the lift axle indicator after a timeout period.

11. The system of claim 10, wherein the representation of the status of a lift axle comprises:
a display of the associated lift axle section in a lowered or lifted position; and
a display of an arrow pointing in a downward or upward direction.

12. The system of claim 11, wherein the representation of the status of the lift axle further comprises a display of an air pressure measurement, wherein the display of the air pressure measurement includes a dynamic display of a current air pressure measurement.

13. The system of claim 10, wherein the system is further configured to:

receive an indication of a tire air pressure measurement or a tire temperature measurement that is outside of a normal setting threshold; and in response to the indication of the tire air pressure measurement or the tire temperature measurement that is outside of a normal setting threshold, display a tire pressure monitoring system (TPMS) indicator including a top-view representation of the vehicle and a representation of a status of each tire in relation to the vehicle representation based on the axle and tire configuration information.

14. The system of claim 13, wherein the top-view representation of the vehicle includes a distinction between a tractor portion of the vehicle from a trailer portion of the vehicle.

* * * * *